United States Patent [19]

Ito et al.

[11] Patent Number: 4,868,610

[45] Date of Patent: Sep. 19, 1989

[54] COPYING APPARATUS WITH SUBJECTIVELY STORED MAGNIFICATION VALUES

[75] Inventors: Masazumi Ito, Toyohashi; Tomoji Murata, Toyokawa; Kenji Shibazaki, Aichi, all of Japan

[73] Assignee: Minolta Camera Kabushiki Kaisha, Osaka, Japan

[21] Appl. No.: 69,403

[22] Filed: Jul. 2, 1987

Related U.S. Application Data

[63] Continuation of Ser. No. 630,729, Jul. 13, 1984, abandoned.

[30] Foreign Application Priority Data

Jul. 15, 1983 [JP] Japan ................................ 58-129941

[51] Int. Cl.[4] ................................................ G03B 15/00

[52] U.S. Cl. ........................................ 355/243; 355/55

[58] Field of Search .................................. 355/243, 55

[56] References Cited

U.S. PATENT DOCUMENTS

| | | | |
|---|---|---|---|
| 4,211,482 | 7/1980 | Arai et al. | 355/14 C X |
| 4,435,077 | 3/1984 | Suzuki et al. | 355/14 C X |
| 4,505,579 | 3/1985 | Furuichi | 355/55 |
| 4,543,643 | 9/1985 | Shibazaki et al. | 355/55 X |
| 4,598,994 | 7/1986 | Tomosada et al. | 355/14 R |
| 4,619,521 | 10/1986 | Miyamoto | 355/14 R |

FOREIGN PATENT DOCUMENTS

| | | | |
|---|---|---|---|
| 58-70250 | 4/1983 | Japan | 355/14 R |

*Primary Examiner*—Arthur T. Grimley

*Assistant Examiner*—J. Pendegrass

*Attorney, Agent, or Firm*—Price, Gess & Ubell

[57] ABSTRACT

A copying apparatus including a numeric value input device, a numeric memory, a numeric display unit, an arithmetic device, an operating device for actuating the arithmetic device, a control device for causing the numeric memory to store an arithmetic result obtained by an arithmetic operation of the arithmetic device, and a magnification control device for controlling operations of the copying apparatus on the basis of the arithmetic result.

50 Claims, 25 Drawing Sheets

Fig. 11a (1)
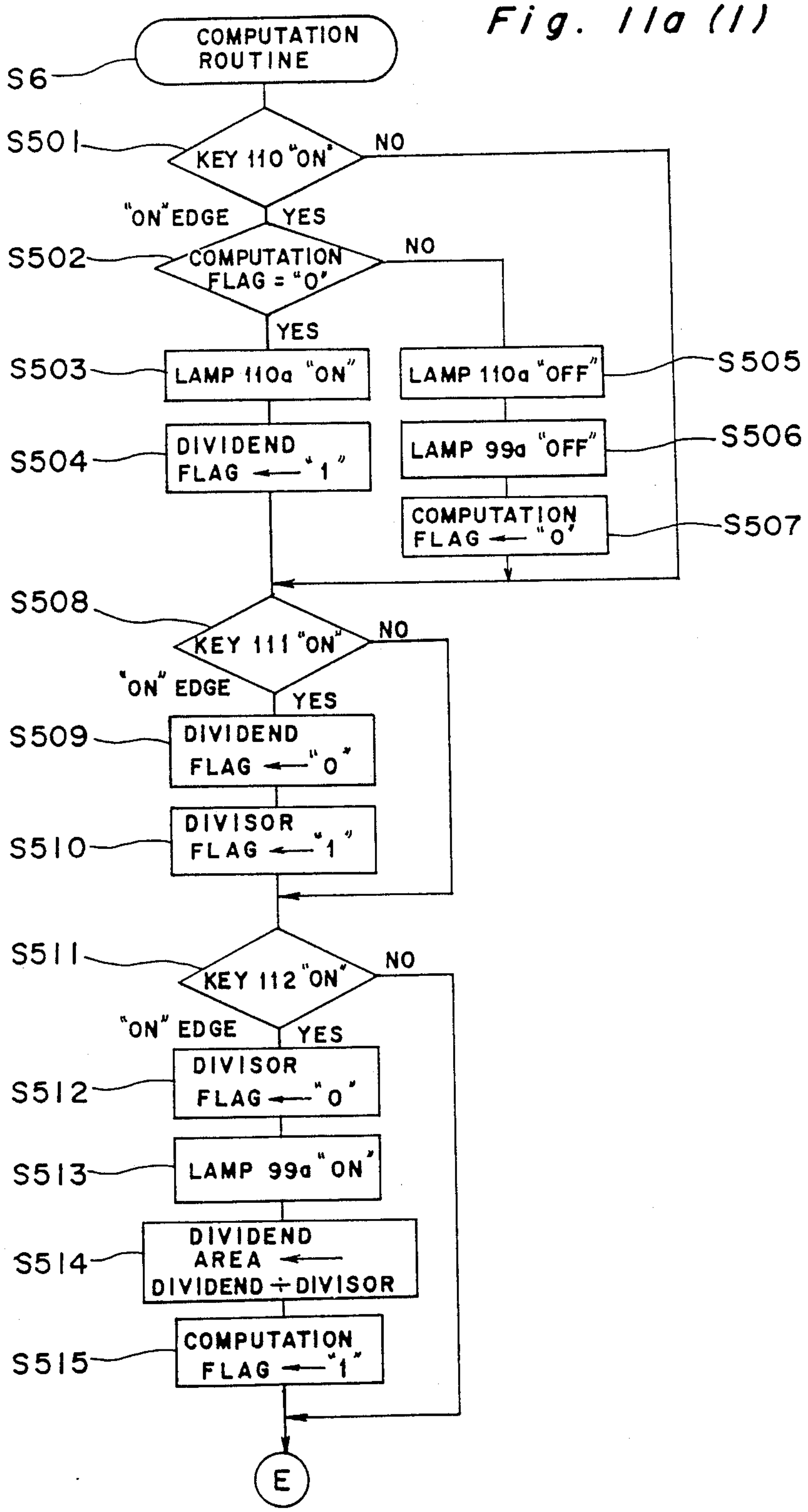

*Fig. 11a (2)*
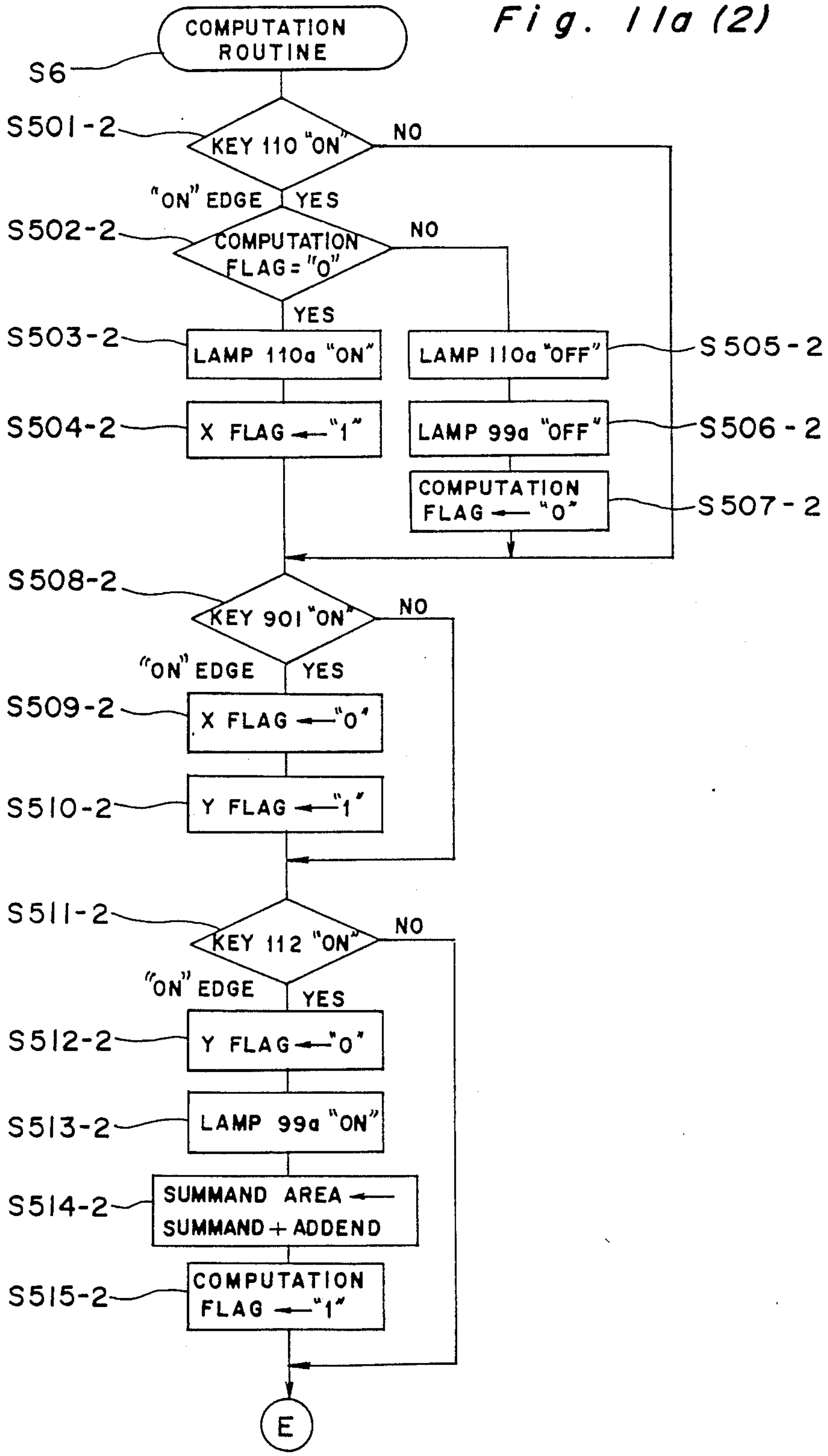

Fig. 11a (3)
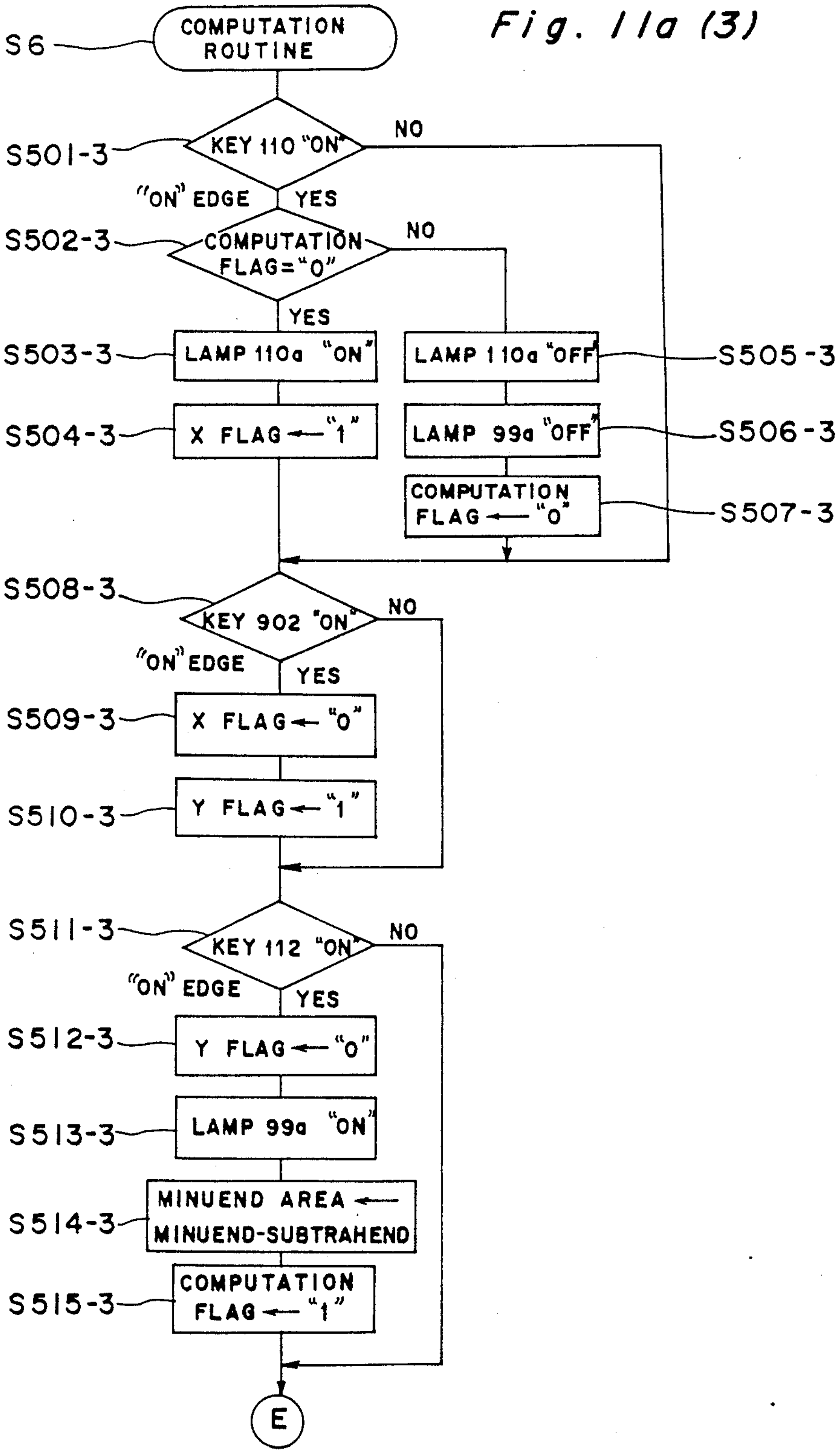

Fig. 11a (4)
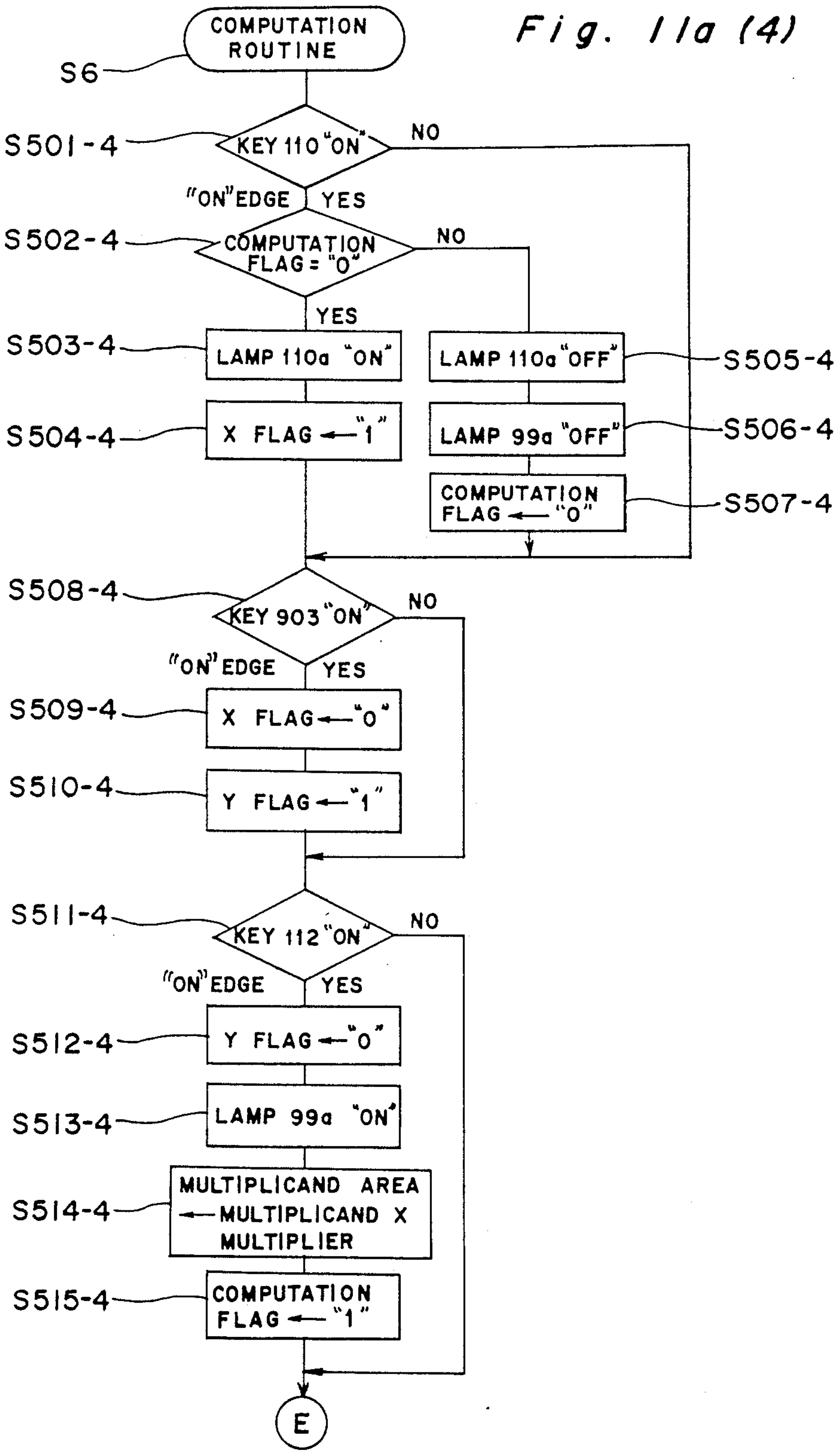

Fig. 11a(5)
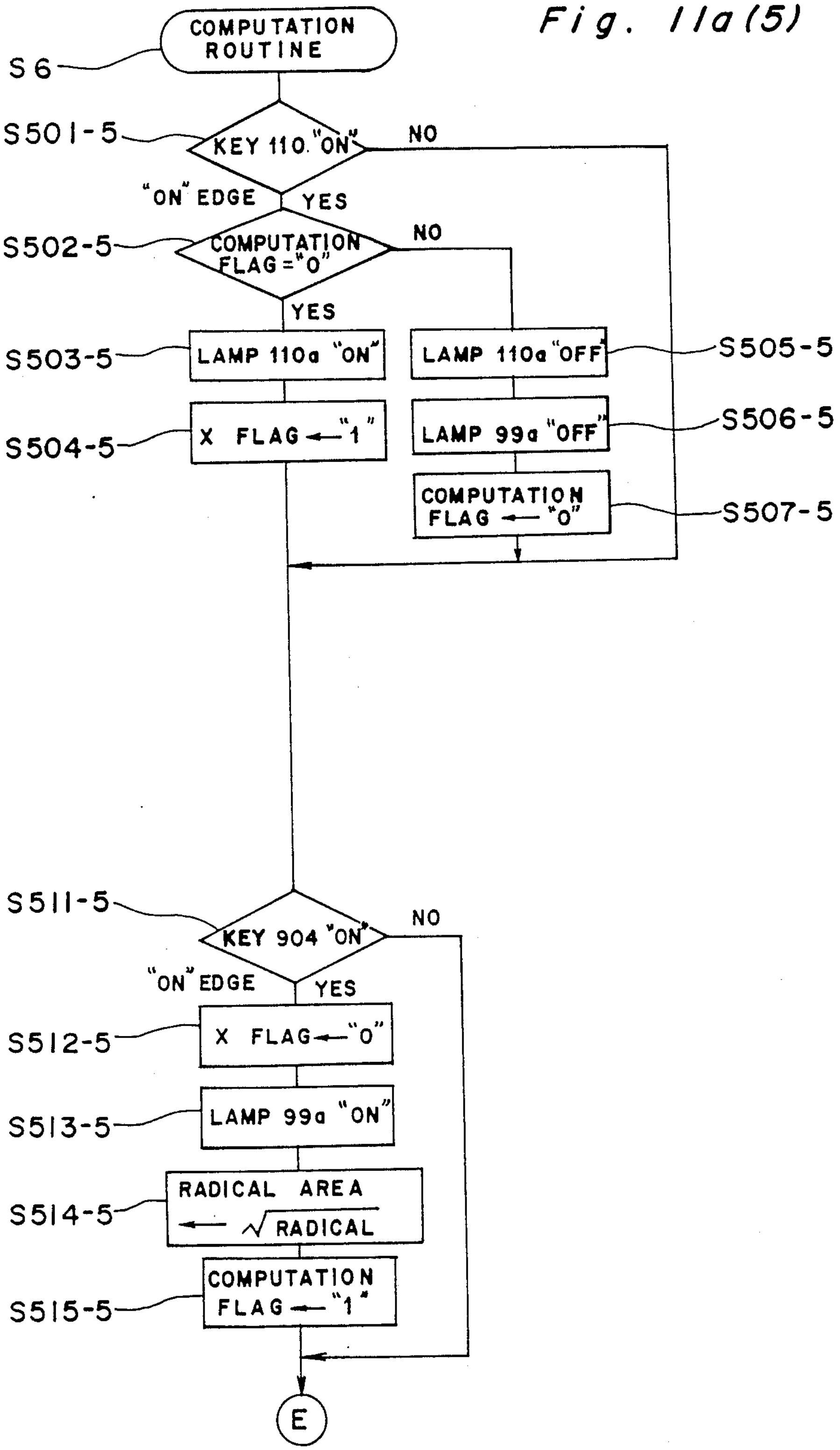

Fig. 11b (1)
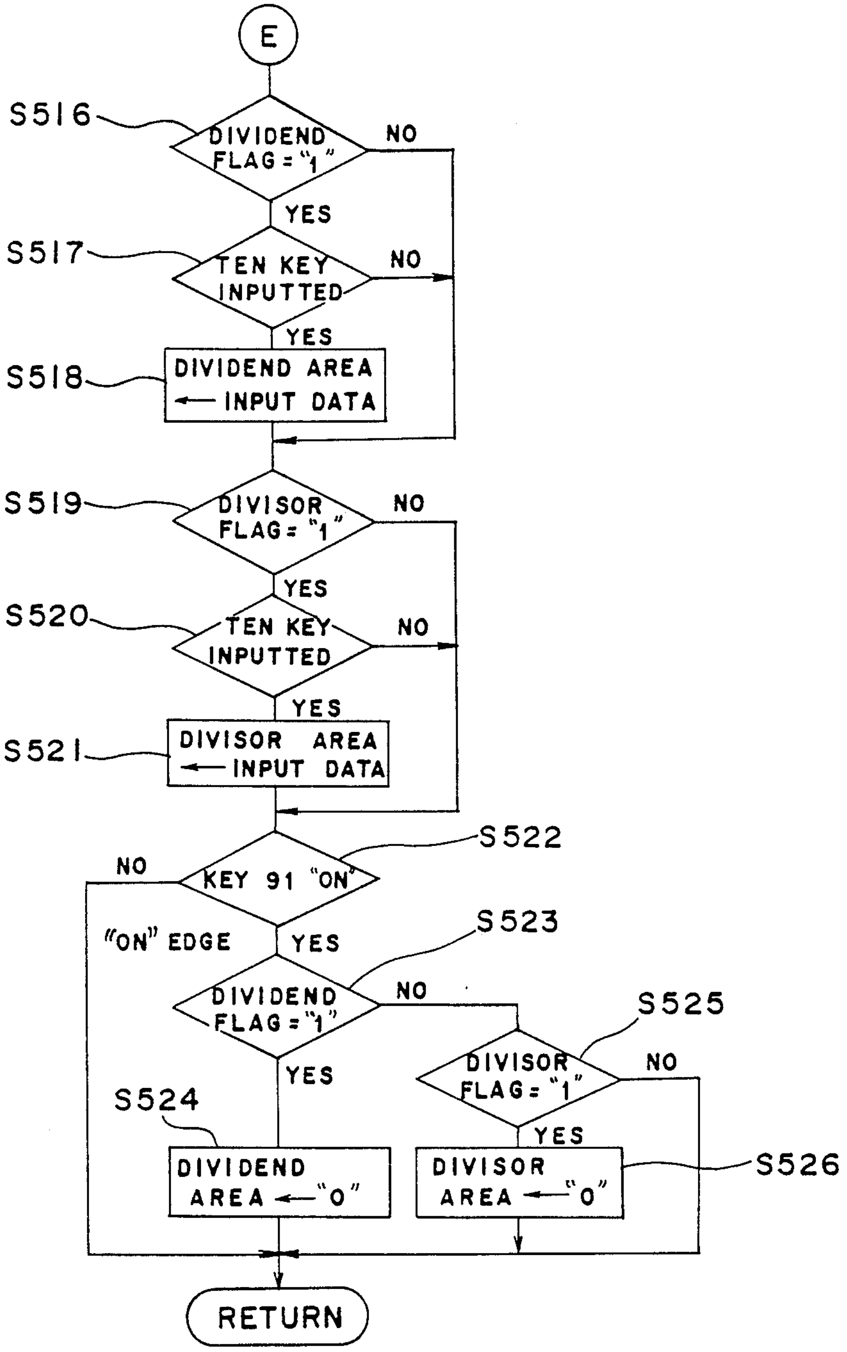

Fig. 11b (2)
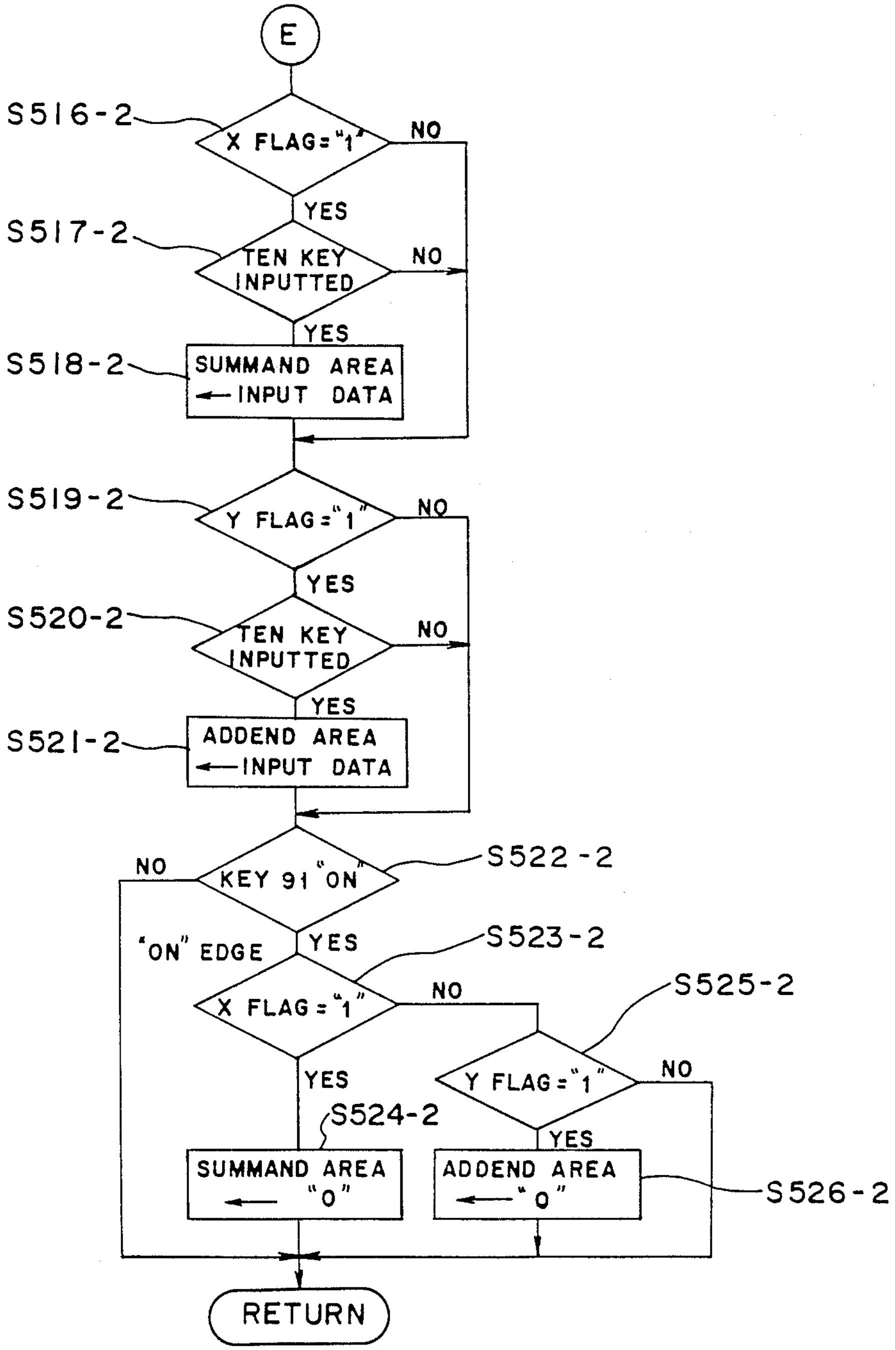

Fig. 11b (3)
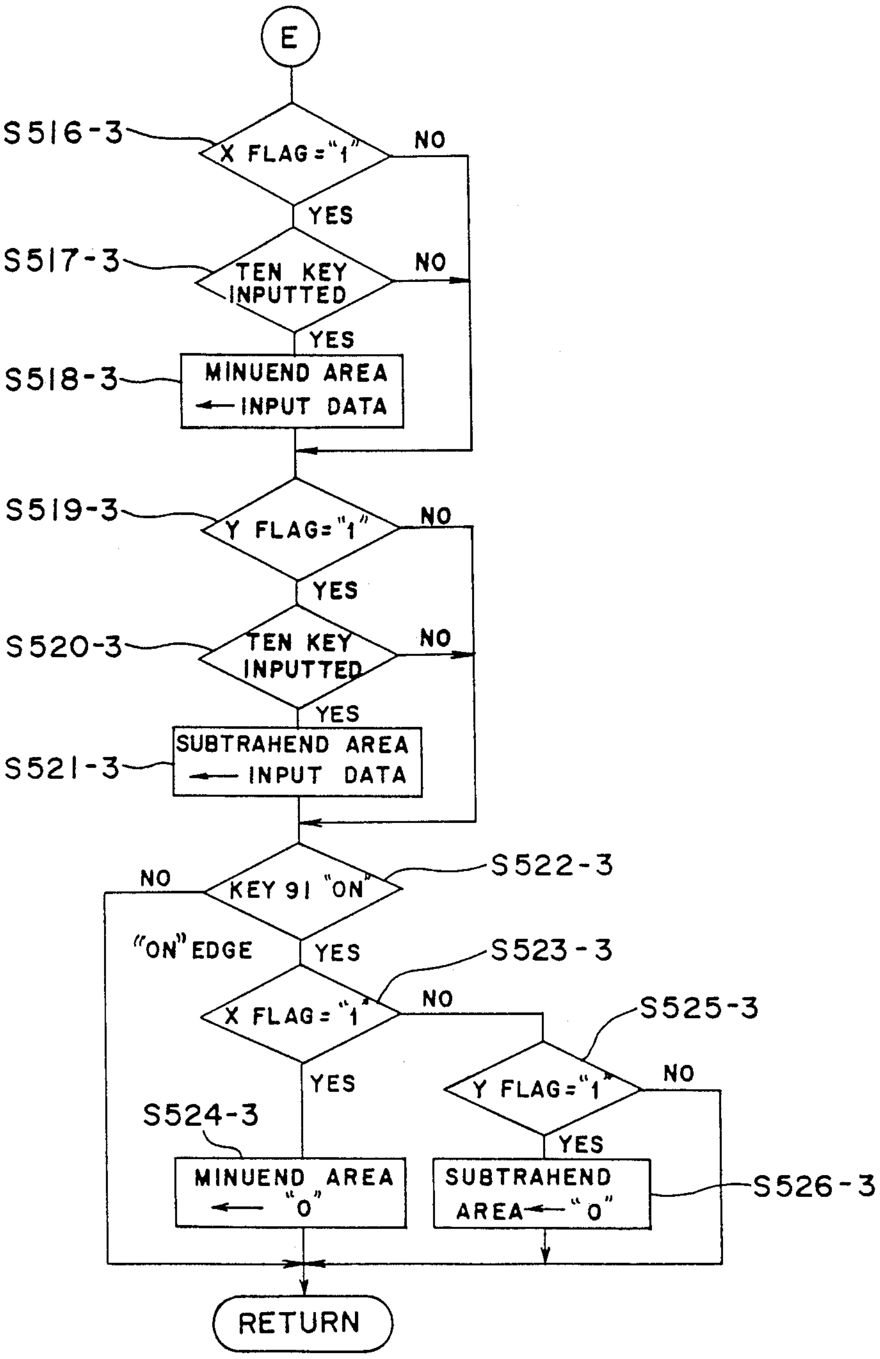

Fig. 11b (4)
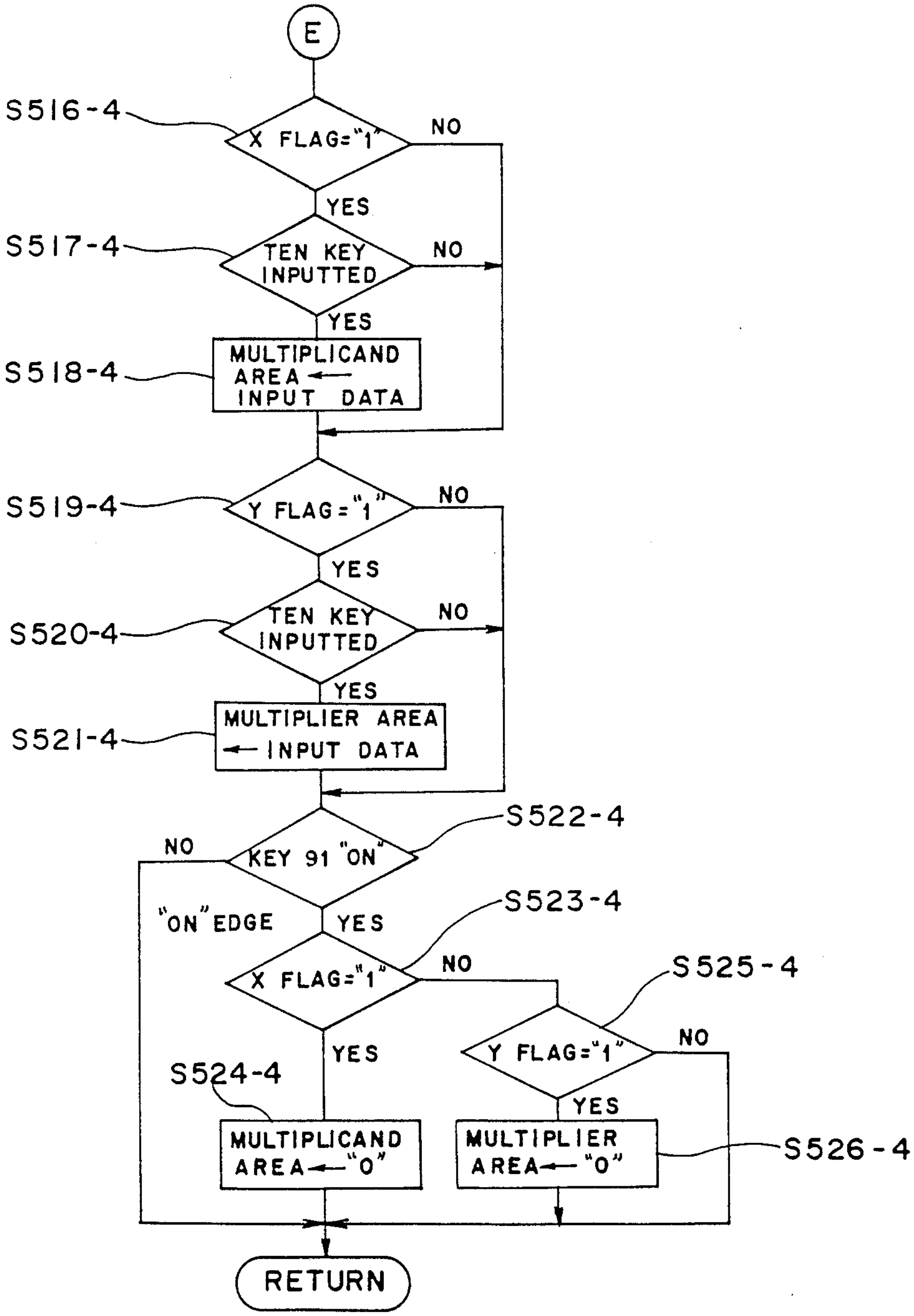

Fig. 11b (5)
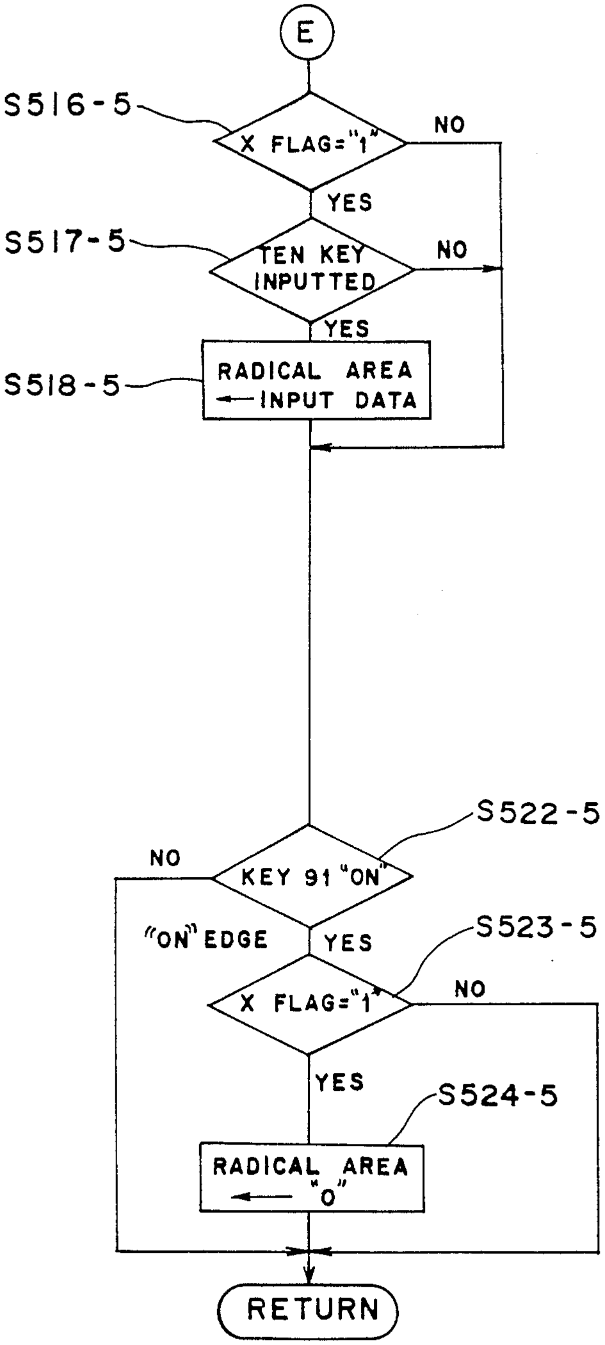

COPYING APPARATUS WITH SUBJECTIVELY STORED MAGNIFICATION VALUES

This is a continuation application Ser. No. 630,729, filed on July 13, 1984, now abandoned.

BACKGROUND OF THE INVENTION

The present invention generally relates to copying apparatuses and more particularly, to a variable copying magnification type copying apparatus by which copying can be performed at arbitrary copying magnifications.

Conventionally, in so-called variable copying magnification type copying apparatuses by which copying can be performed not only at predetermined copying magnifications between standardized paper sizes, for example, from a paper size of A4 for an original sheet to be copied to that of B4 for a copy paper (A4 and B4 denoting paper sizes prescribed in the Japanese Industrial Standards (JIS)) but at arbitrary copying magnifications, it has been so arranged that, in the case where the original sheet is copied through enlargement or reduction thereof in size, operators of the copying apparatuses calculate a copying magnification on the basis of a size of the original sheet and a desired size of a copy paper by using a desk-top calculator, etc. and then, input the calculated result into the copying apparatuses by manipulating an "arbitrary-magnification" key thereof before performing the copying operation. Thus, the prior art copying apparatuses have such a disadvantage that, in order to perform the copying operations, the operators are required to calculate the copying magnifications and further, input the calculated results into the copying apparatuses, which are extremely troublesome.

SUMMARY OF THE INVENTION

Accordingly, an essential object of the present invention is to provide an improved variable copying magnification type copying apparatus in which calculation and input of a copying magnification can be performed through simplified operations, with substantial elimination of the disadvantages inherent in conventional copying apparatuses of this kind.

Another important object of the present invention is to provide an improved copying apparatus of the above described type which is highly reliable in actual use.

In accomplishing these and other objects according to one preferred embodiment of the present invention, there is provided an improved copying apparatus comprising: a numeric value input means which is manually operable; a memory means for storing numeric data; a display means for displaying a numeric value which has been inputted by said numeric value input means; an arithmetic means for executing an arithmetic operation for the numeric value which has been displayed by said display means; an operating means for causing said arithmetic means to execute the arithmetic operation: a control means for causing, upon a predetermined operation, said memory means to store an arithmetic result obtained by the arithmetic operation which has been executed by said arithmetic means; and a magnification control means which uses the arithmetic result, stored in said memory means, as copying magnification data so as to control operations of said copying apparatus on the basis of the copying magnification data.

In accordance with the present invention, it becomes possible to th copying magnifications at any arbitrary value in a simplified stepless manner.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings

DETAILED DESCRIPTION OF THE INVENTION

Figure 1:
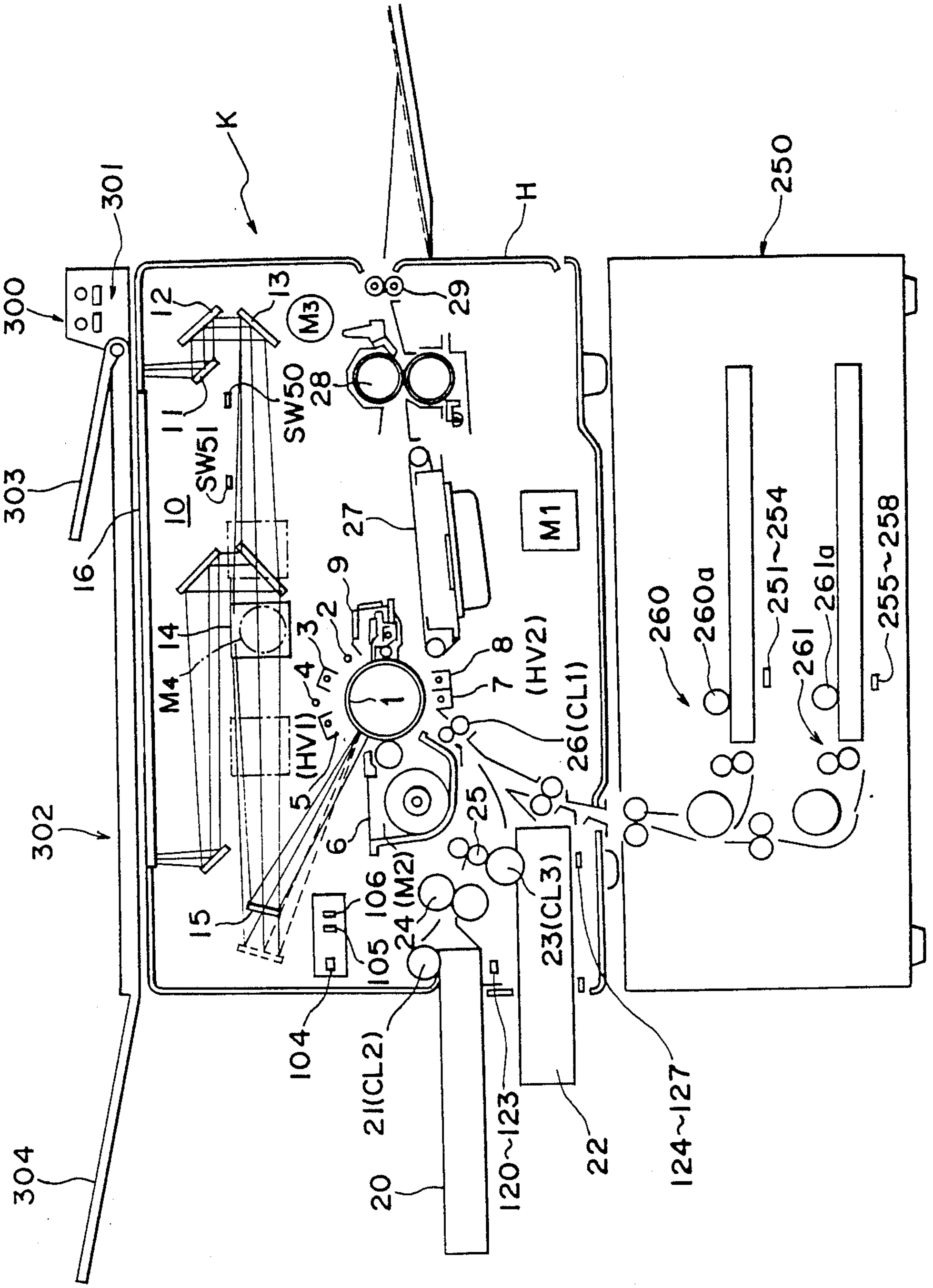
FIG. 1 is a schematic side sectional view of a copying apparatus according to one preferred embodiment of the present invention.

Referring to the drawings, there is shown in FIG. 1, a electro-optical copying apparatus K according to one preferred embodiment of the present invention. The copying apparatus K generally includes a photosensitive or photoreceptor drum 1 which is rotatably mounted approximately at a central portion of an apparatus housing H for rotation in the counterclockwise direction, and around which a main eraser lamp 2, an auxiliary corona charger 3, an auxiliary eraser lamp 4, a main corona charger 5, a developing device 6, a transfer charger 7, a charge eraser 8, a blade type cleaning device 9, etc. are sequentially disposed along the circumference of the photosensitive drum 1 in a known manner. The apparatus housing H is placed on a paper feeding stand 250 acting also as a support base for the apparatus housing H.

The photosensitive drum 1 has a photosensitive layer formed on its peripheral surface The copying apparatus K further includes an optical system 10 disposed above the photosensitive drum 1 and an original sheet platform 16 for an original sheet (not shown) to be copied, provided at an upper portion of the apparatus housing H. The photosensitive layer of the photosensitive drum 1 is subjected to sensitization and corona charging during its passing through the main eraser lamp 2, auxiliary corona charger 3, auxiliary eraser lamp 4 and main corona charger 5 so as to undergo, from the optical system 10, exposure of an image of the original sheet. The optical system 10 is provided below the original sheet platform 16 having the original sheet placed facedown thereon so as to scan the image of the original sheet and is constituted by a light source (not shown), movable mirrors 11, 12 and 13, a lens 14 and a mirror 15. The photosensitive drum 1 is arranged to rotate at a constant peripheral speed v regardless of whether copying is performed at an equal size magnification or at varied magnifications In the case where copying is performed at a copying magnification m, the light source and the movable mirror 11 are driven by a DC motor M3 so as to be moved at a speed of v/m in the leftward direction in FIG. 1, while the movable mirrors 12 and 13 are driven by the DC motor M3 so as to be moved at a speed of v/2m in the leftward direction in FIG. 1. Meanwhile, in order to change the copying magnification, the lens 14 is moved along its optical axis, while the mirror 15 is moved and pivoted.

Furthermore, upper and lower paper feeding sections 20 and 22 are provided at a left lower portion of the apparatus housing H such that the upper paper feeding section 20 is disposed above the lower paper feeding section 22. The upper and lower paper feeding sections 20 and 22 are, respectively, provided with upper and lower paper feeding rollers 21 and 23. A transport passage for copy papers is formed by a pair of rollers 24, a pair of rollers 25, a pair of timing rollers 26, a transport belt 27, a fixing device 28 and a pair of outlet rollers 29 as shown.

The copying apparatus K further includes an automatic document feeder (referred to as an "ADF", hereinbelow) 302 provided on the original sheet platform 16. In the ADF 302, a switch for setting the ADF 302 to an automatic paper selection mode and an indicator for the automatic paper selection mode are designated by a reference numeral 300, while a switch for setting the ADF 302 to an automatic magnification selection mode and an indicator for the automatic magnification selection mode are designated by a reference numeral 301.

Detection switches 120 to 123 for detecting paper size codes of the upper paper feeding section 20 and detection switches 124 to 127 for detecting paper size codes of the lower paper feeding section 22 are provided in the apparatus housing H. Meanwhile, paper feeding mechanisms 260 and 261 are provided in the paper feeding stand 250 such that the paper feeding mechanism 260 is disposed above the paper feeding mechanism 261. In the same manner as the apparatus housing H, detection switches 251 to 254 for detecting paper size codes of the paper feeding mechanism 260 and detection switches 255 to 258 for detecting paper size codes of the paper feeding mechanism 261 are provided in the paper feeding stand 250.

In the ADF 302, an original sheet to be copied is inserted face-down from a tray 304 onto the original sheet platform 16 an then, is transported to a predetermined position on the original sheet platform 16 so as to be stopped thereat After the copying operation, the original sheet is turned over and is ejected onto a tray 303. Accordingly, in order to prevent start of operation of the copying apparatus K during transport of the original sheet and prevent transport of the original sheet at least during scanning of the copying apparatus K, the copying apparatus K and the ADF 302 are operatively associated with each other.

Meanwhile, the paper feeding mechanisms 260 and 261 includes paper feeding rollers **260*a* and 261*a*, respectively. The paper feeding rollers 260*a* and 261*a* are selectively driven by a command from a microcomputer provided in the apparatus housing H. In this respect, it is to be noted that signals for starting paper feeding of the paper feeding rollers 260*a* and 261*a* are required to be outputted at a timing faster than those of the upper and lower paper feeding rollers 21 and 23**.

Figure 2:
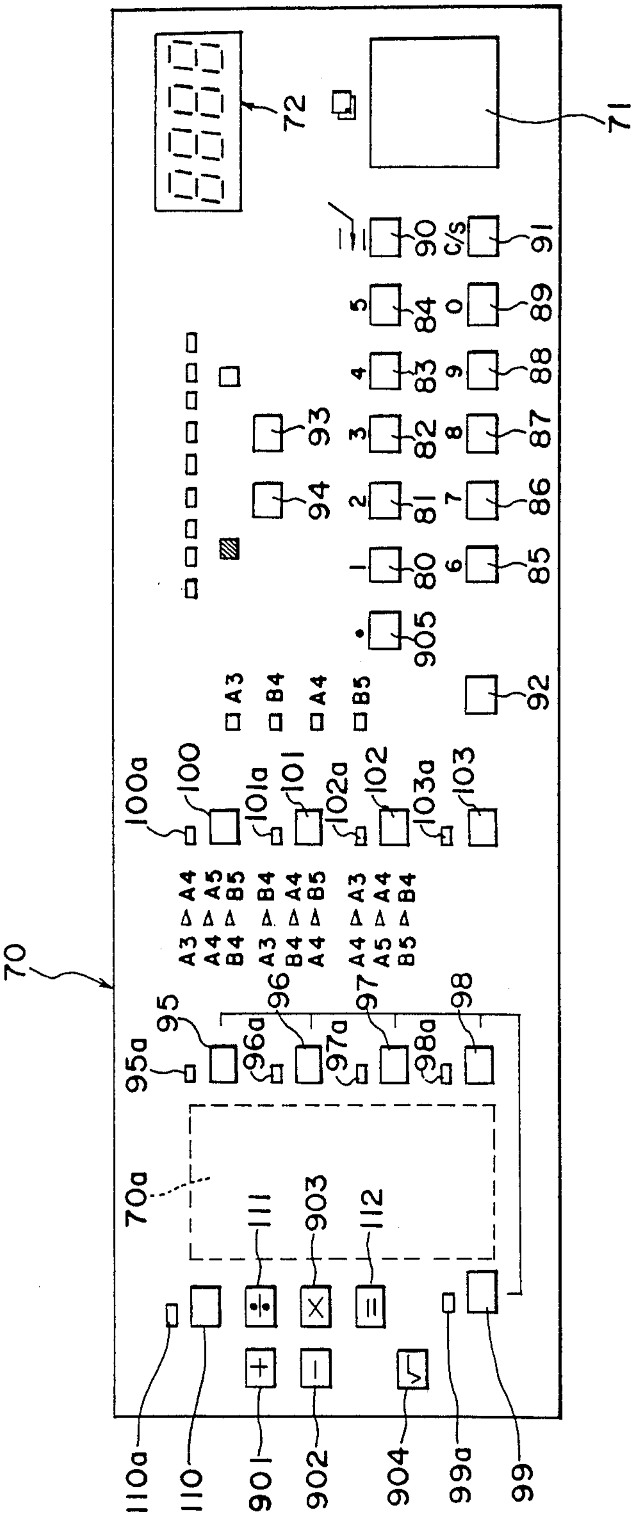
FIG. 2 is a front elevational view of an operating panel employed in the copying apparatus of FIG. 1.

Referring to FIG. 2, there is shown an operating panel 70 employed in the copying apparatus K. The operating panel 70 includes a print key 71 for starting the copying operation, a digital display unit 72 for displaying numerals of four figures, ten keys 80 to 89 corresponding to numerals of 1 to 9 and 0, respectively, an interruption key 90 for designating interruption mode copying, a clear/stop key 91, a paper selection key 92 for designating, according to sizes of the copy papers, the copy papers of one size from among the copy papers of different sizes accommodated in the multistage paper feeding cassettes, respectively, an "up" key 93 and a "down" key 94 for designating density of a copying image stepwise, and a first group of keys 95 to 98 and a second group of keys 100 to 103, with the keys 95 to 98 and 100 to 103 being associated with a copying magnification setting device.

The first group of the keys 95 to 98 are provided for establishing a first magnification setting mode for setting the copying magnifications arbitrarily. When one of the keys 95 to 98 is actuated in a state where a control mode of the copying apparatus K has been changed over to the first magnification setting mode by actuating a key 99 for changing over the control mode of the copying apparatus K to the first magnification setting mode, the numeral, which is displayed by the digital display unit 72 after having been inputted by the ten keys 80 to 89, is stored, as the copying magnification, in a memory corresponding to the actuated one of the keys 95 to 98. A display lamp **99*a*** indicates that the first magnification setting mode in which the copying magnifications are set arbitrarily is established.

Meanwhile, predetermined copying magnifications are, respectively, preset in memories corresponding, respectively, to the second group of the keys 100 to 103 such that the copying operation is performed on the basis of the preset numerals without the need for digital setting of the first group of the keys 95 to 98. Accordingly, magnifications which are considered to be frequently used by respective customers are selected as the preset copying magnifications at the time of, for example, forwarding of the copying apparatus K out of a manufacturing plant thereof as will be described later.

Thus, the first group of the keys 95 to 98 enable the operator to set the required copying magnifications arbitrarily. On the other hand, the second group of the keys 100 to 103 function differently from the first group of the keys 95 to 98 such that predetermined copying magnifications for general use are preset in the memories corresponding, respectively, to the second group of the keys 100 to 103. In the case where the copying apparatus K is for use in Japan, magnifications between standardized paper sizes, for example, from a paper size of A4 for the original sheet to that of B5 for the copy paper, from a paper size of B4 for the original sheet to that of A4 for the copy paper, from a paper size of A3 for the original sheet to that of A4 for the copy paper and from a paper size of A4 for the original sheet to that of A3 for the copy paper are, respectively, allotted to the preset copying magnifications. It should be noted that A3, A4, B4 and B5 denotes paper sizes prescribed in the Japanese Industrial Standards (JIS). However, since the numeric value preset by the second group of the keys 100 to 103 shows a general or computed copying magnification, such a phenomenon may take place that a duplicate actually has a copying magnification slightly different from the preset numeric value due to mechanical errors or design errors. For example, even if an equal size magnification, i.e. a magnification of 1 is selected, its real magnification may assume a numeric value of, for example, 1.004 or 0.996. In this case, the control mode of the copying apparatus K is changed over to a second magnification mode for the second group of the keys 100 to 103 by manipulating a key 104 for changing over the control mode of the copying apparatus K to the second magnification setting mode and arbitrary numeric values are, respectively, stored in the memories corresponding, respectively, to the keys 100 to 103 in the same manner as in the first magnification setting mode, whereby it becomes possible to obtain a desired copying magnification. More specifically, an equal size magnification key can be set at a numeric value of 1.002 or 0.998.

The operating panel 70 further includes a compute mode key 110. In the case where an image of an original sheet to be copied is copied at an enlarged size magnification or at a reduced size magnification, a compute mode for computing the copying magnification from a size of the original sheet and a desired size of the copy paper is set by depressing the compute mode key 110. A display lamp 110*a* is provided for indicating that the copying apparatus K is in the compute mode and is turned on by depressing the compute mode key 110.

Furthermore, the operating panel 70 includes a division key 111, an "equal" key 112, an addition key 901, a subtraction key 902, a multiplication key 903, a square root key 904 and a key 905. For example, in the case of division, after a size, i.e. a length of one side of a copy paper, which corresponds to its dividend, has been keyed in by the use of the ten keys 80 to 89, the division key 111 is depressed and then, a size, i.e. a length of an original sheet to be copied, which corresponds to its divisor, is keyed in by the use of he ten keys 80 to 89. Subsequently, when the "equal" key 112 is depressed, division for dividing the size of the copy paper by the size of the original sheet is performed, so that it becomes possible to store its computational result in one of the memories corresponding, respectively, to the copying magnification setting keys 95 to 98 and 100 to 103.

Figure 3:
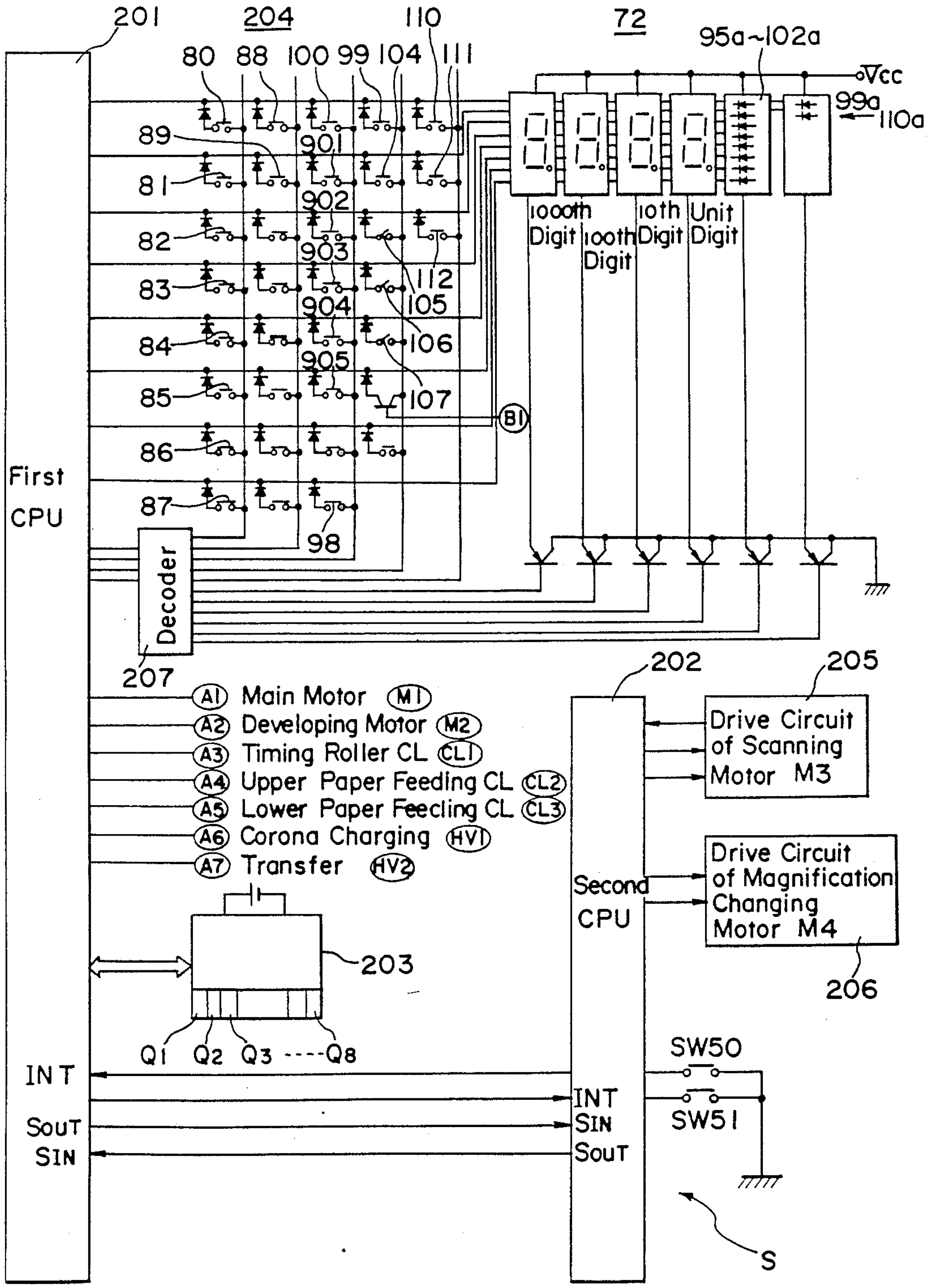
FIG. 3 is an electrical block diagram of the copying apparatus of FIG. 1.

Referring to FIG. 3, there is shown a control circuit S employed in the copying apparatus K. The control circuit S includes a first central processing unit (CPU) 201 and a second central processing unit (CPU) 202 for controlling the optical system 10. Each of the first CPU 201 and the second CPU 202 has an interruption terminal INT, a data input terminal Sin and a data output terminal Sout. The first CPU 201 and the second CPU 202 are connected to each other through the interruption terminal INT, data input terminal Sin and data output terminal Sout of each of the first CPU 201 and the second CPU 202 such that the first CPU 201 controls the second CPU 202. The control circuit S further includes a random access memory (RAM) 203 equipped with a battery, a switch matrix 204, a drive circuit 205 for the DC motor M3 for scanning the original sheet, a drive circuit 206 for a stepping motor M4 for copying at varied magnifications, and a decoder 207. Meanwhile, input terminals A1, A2, A3, A4, A5, A6 and A7 of the first CPU 201 are, respectively, connected to transistors (not shown) for switching drive of a main motor M1, a developing motor M2, a timing roller clutch CL1 for the timing rollers 26, an upper paper feeding clutch CL2 for the upper paper feeding section 20, a lower paper feeding clutch CL3 for the lower paper feeding section 22, the main corona charger 5 and the transfer charger 7.

Various data for controlling the copying operations are written into the RAM 203 or are shifted from a read-only memory (ROM) of the first CPU 201 to the RAM 203 so as to be stored in the RAM 203. The RAM 203 is provided with memories Q1, Q2, Q3 and Q4 corresponding, respectively, to the second group of the keys 100, 101, 102 and 103. As will be described later in detail, when the key 100, for example, is turned on, the magnification displayed by the digital display unit 72 is written into or read from the memory Q1. Similarly, when the key 101 is turned on, the magnification displayed by the digital display unit 72 is written into or read from the memory Q2. In the same manner as described above, the RAM 203 is further provided with memories Q5, Q6, Q7 and Q8 corresponding, respectively, to the first group of the keys 95, 96, 97 and 98. For example, when the key 95 is turned on, the magnification is written into or read from the memory Q5. Table 1 below shows codes corresponding to paper sizes. It is to be noted that A3, A4, A5, A6, B4, B5 and B6 denote paper sizes of 297 by 420 mm, 210 by 297 mm, 148 by 210 mm, 105 by 148 mm, 257 by 364 mm, 182 by 257 mm and 128 by 182 mm, respectively prescribed in the Japanese Industrial Standards (JIS).

TABLE 1

| Decimal code | Binary code | Paper size (JIS) | |
|---|---|---|---|
| 0 | 0000 | | |
| 1 | 0001 | A6 | Longitudinal feeding* |
| 2 | 0010 | B6 | " |
| 3 | 0011 | A5 | " |
| 4 | 0100 | B5 | " |
| 5 | 0101 | A4 | " |
| 6 | 0110 | B4 | " |
| 7 | 0111 | A3 | " |
| 8 | 1000 | | |
| 9 | 1001 | A5 | Sidewise feeding** |
| 10 | 1010 | B5 | " |
| 11 | 1011 | A4 | " |
| 12 | 1100 | B4 | " |
| 13 | 1101 | A3 | " |
| 14 | 1110 | | |
| 15 | 1111 | | Empty cassette |

*Longitudinal feeding denotes paper feeding in which a longitudinal side of the paper is oriented in the paper feeding direction.
**Sidewise feeding denotes paper feeding in which a widthwise side of the paper is oriented in the paper feeding direction.

Figure 4:
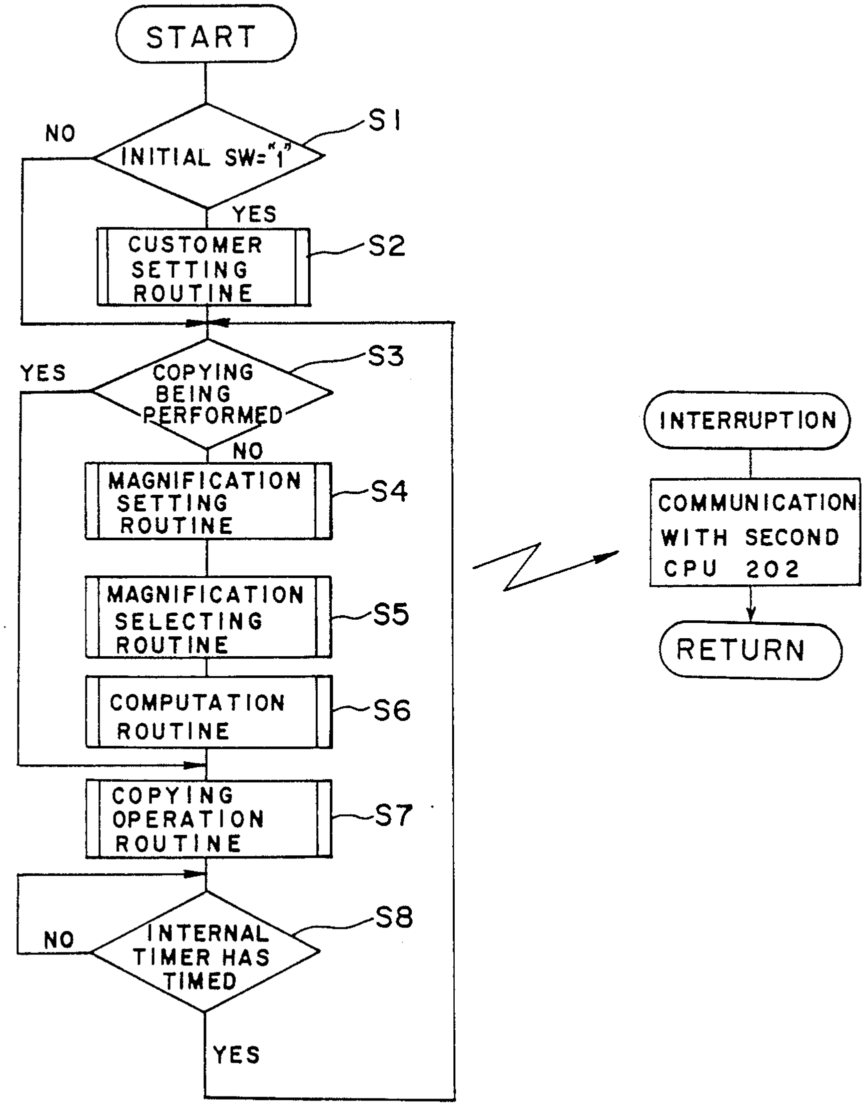
FIGS. 4 5, *6a*, *7a*, *7b*, 8, 9, 10, **11*a*(1)–(5), 11*b*(1)–(5), 12*a* and 12*b* are flow charts explanatory of processing sequences for controlling setting of copying magnifications and copying operations of the copying apparatus of FIG. 1.

FIGS. 4 to 12 are flow charts showing processing sequences of control of magnification setting and copying operations, which control is executed by the first CPU 201. FIG. 4 shows the processing sequences in the first CPU 201 schematically and summarily. As shown in FIG. 4, the first CPU 201 and the second CPU 202 are communicated with each other through interruption. Such data as a scanning command for the optical system 10, a scanning size, a copying magnification, a timing signal, a return signal, a positioning signal, etc. are transmitted between the first CPU 201 and the second CPU 202.

At steps S1 and S2, a processing for presetting the predetermined magnifications in the memories Q1 to Q4, which is mainly performed at the time of assembly of the copying apparatus K or at the time of forwarding of the copying apparatus K out of a manufacturing plant thereof, is executed. Step S2 is shown in detail in FIG. 5. Subsequently, at steps S3 and S4, when the copying apparatus K is not performing a copying operation, the keys 95 to 98 and 100 to 103 are, respectively, set at the copying magnifications stored in the memories Q5 to Q8 and Q1 to Q4. Step S4 is shown in detail in FIGS. 6 to 8. At step S5, a processing for transmitting to the second CPU 202 data for controlling position of the lens 14 and drive speed of the stepping motor M4 in accordance with the magnifications set at step S4 is executed.

At this time, the data are transmitted to the second CPU 202 through interruption. Step S5 is shown in detail in FIGS. 9 and 10. At step S6, a processing for computing the copying magnifications in the compute mode described earlier is executed. Step S6 is shown in detail in FIG. 11. At step S7, a processing for controlling the copying operation is executed. Step S7 is shown in detail in FIG. 12. Meanwhile, FIG. 13 is a time chart showing the copying operation of step S7.

Figure 5:
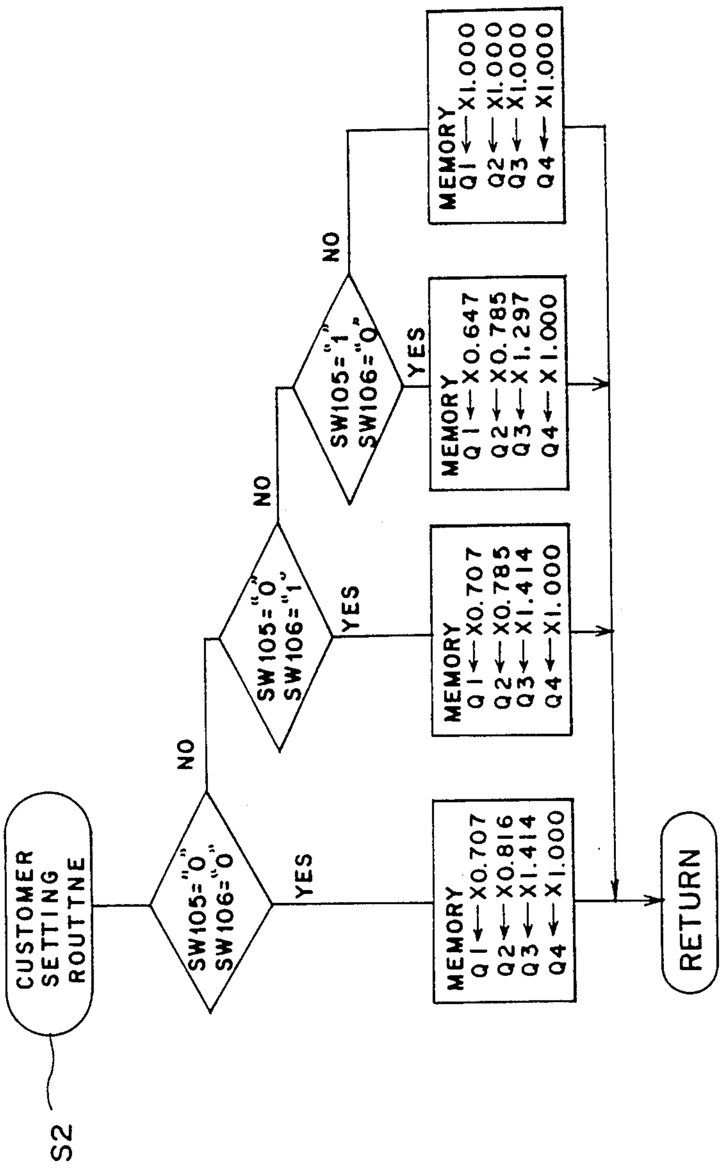

FIG. 5 is a flow chart showing in detail an initial setting processing for presetting the predetermined magnifications in the memories Q1 to Q4 corresponding, respectively, to the second group of the keys 100 to 103. It is to be noted that an initial switch of step S1 of FIG. 4 is provided at such a usually inaccessible position in the copying apparatus K as to be operated at the time of assembly of the copying apparatus K in the manufacturing plant or as to be accessible only by servicemen. Only when the initial switch has been actuated, the processing shown in FIG. 5 is executed. The numeric values preset in the memories Q1 to Q4 are determined by "on" and "off" states of switches 105 and 106 of FIG. 1. More specifically, at the time of assembly of the copying apparatus K or forwarding of the copying apparatus K out of the manufacturing plant, a plant worker turns on and off the switches 105 and 106 on the basis of combinations of the "on" and "off" states decided beforehand according to customers, etc. so as to close the initial switch and then, presets the predetermined numeric values in the memories Q1 to Q4, respectively. One example of the numeric values preset in the memories Q1 to Q4 based on the combinations of the "on" and "off" states of the switches 105 and 106 is shown in Table 2 below.

TABLE 2

| Switch | | Magnification | | | |
|---|---|---|---|---|---|
| 105 | 106 | Q1 | Q2 | Q3 | Q4 |
| 0 | 0 | 0.707 | 0.816 | 1.414 | 1.000 |
| 0 | 1 | 0.707 | 0.785 | 1.414 | 1.000 |
| 1 | 0 | 0.647 | 0.785 | 1.297 | 1.000 |
| 1 | 1 | 1.000 | 1.000 | 1.000 | 1.000 |

Figure 7A:
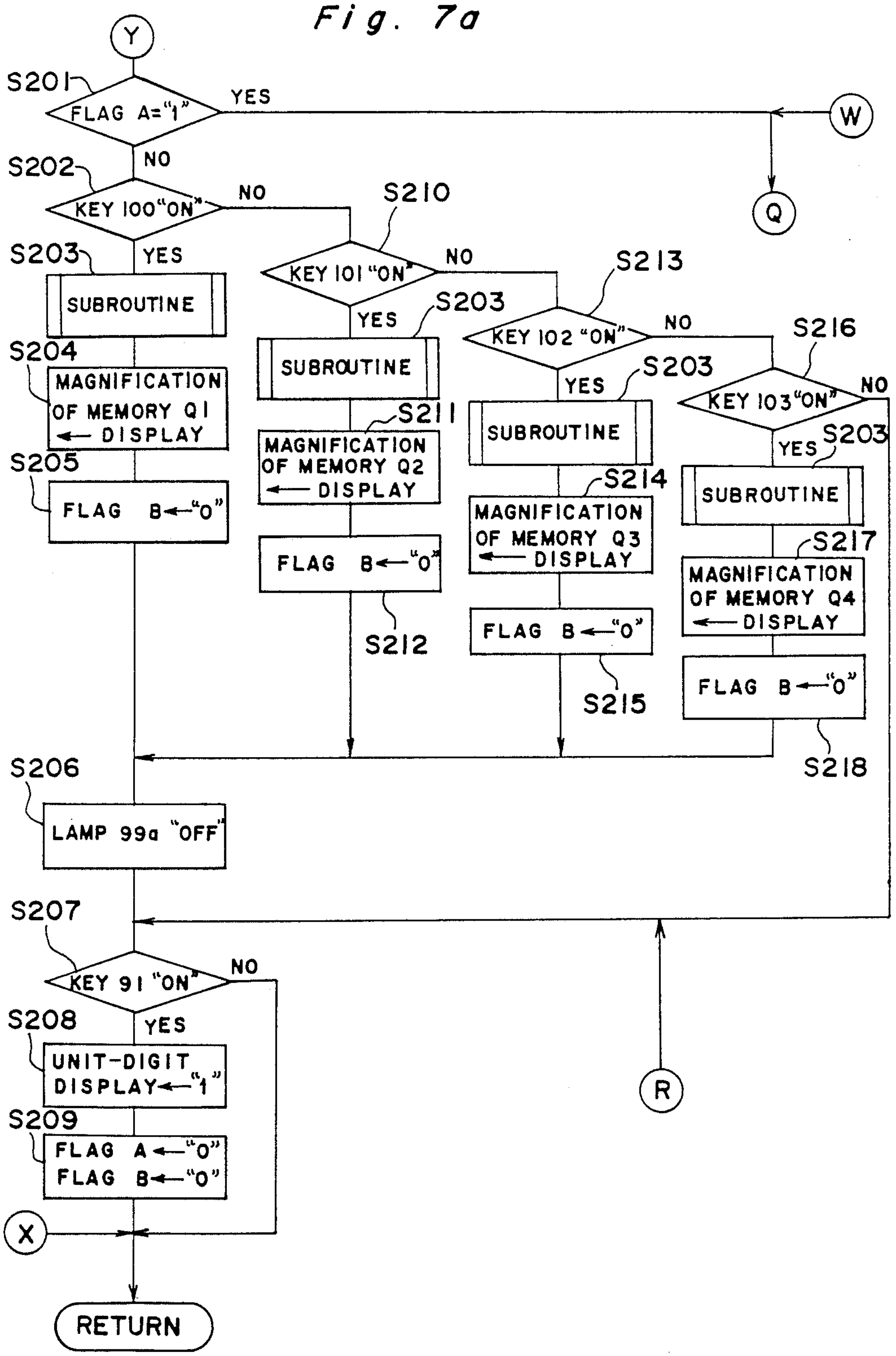
Figure 7B:
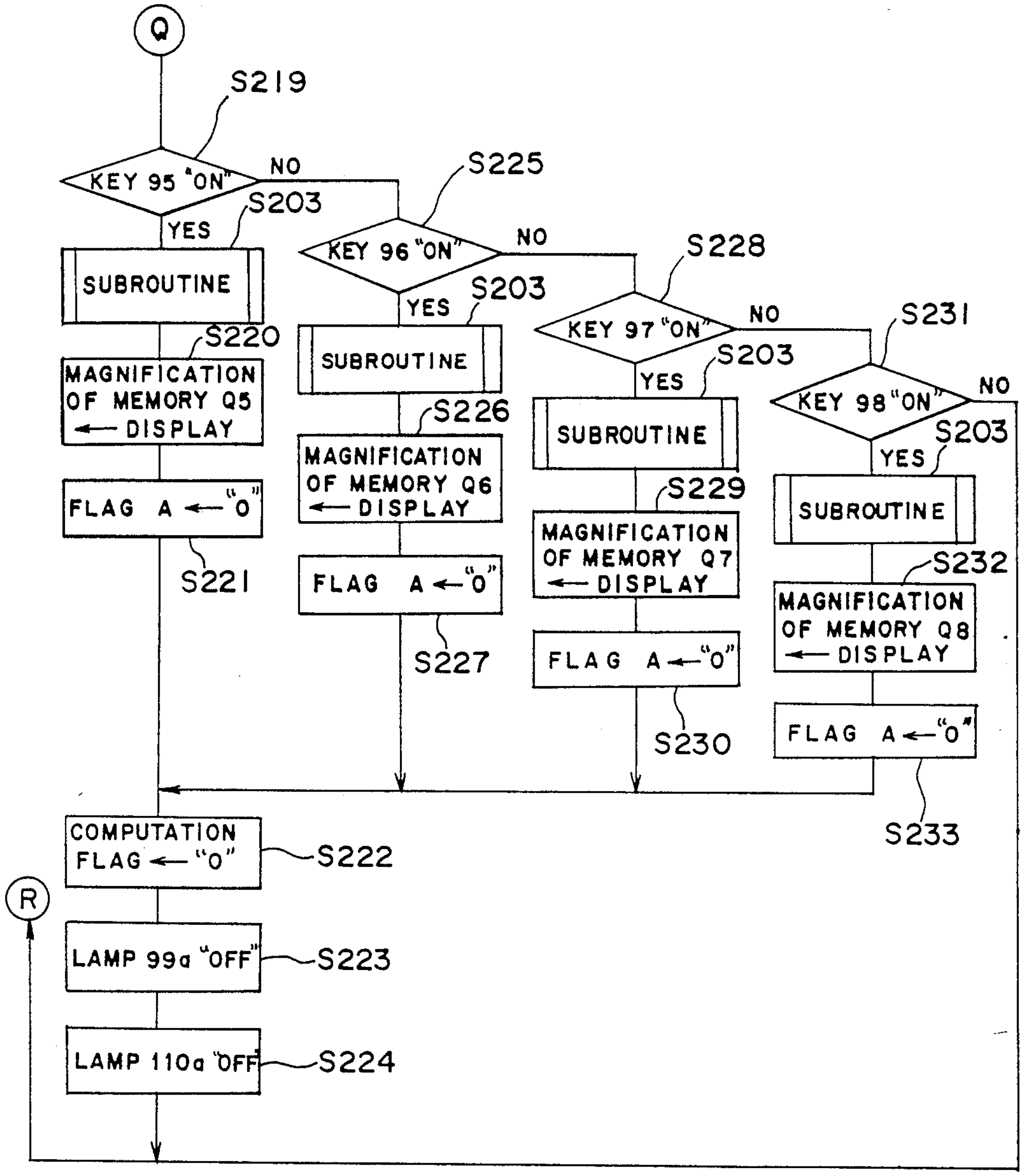
Figure 8:
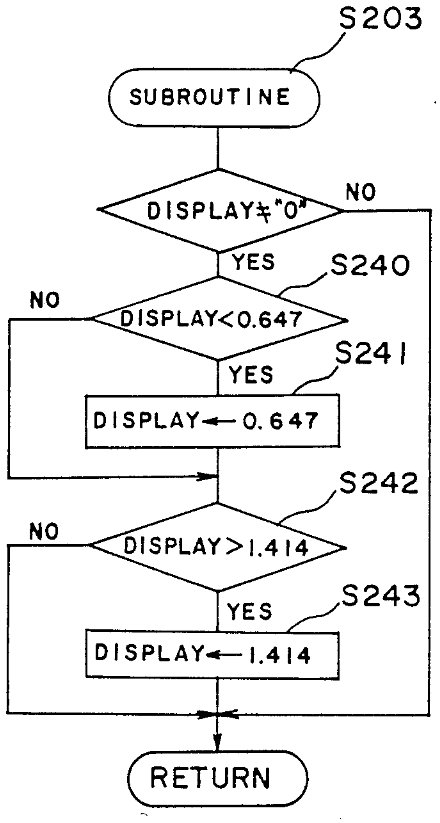

When the numeric values of the copying magnifications are set in the memories Q1 to Q8 corresponding, respectively, to the keys 100 to 103 and 95 to 98, the processing shown in FIGS. 6 to 8 is executed.

Figure 6A:
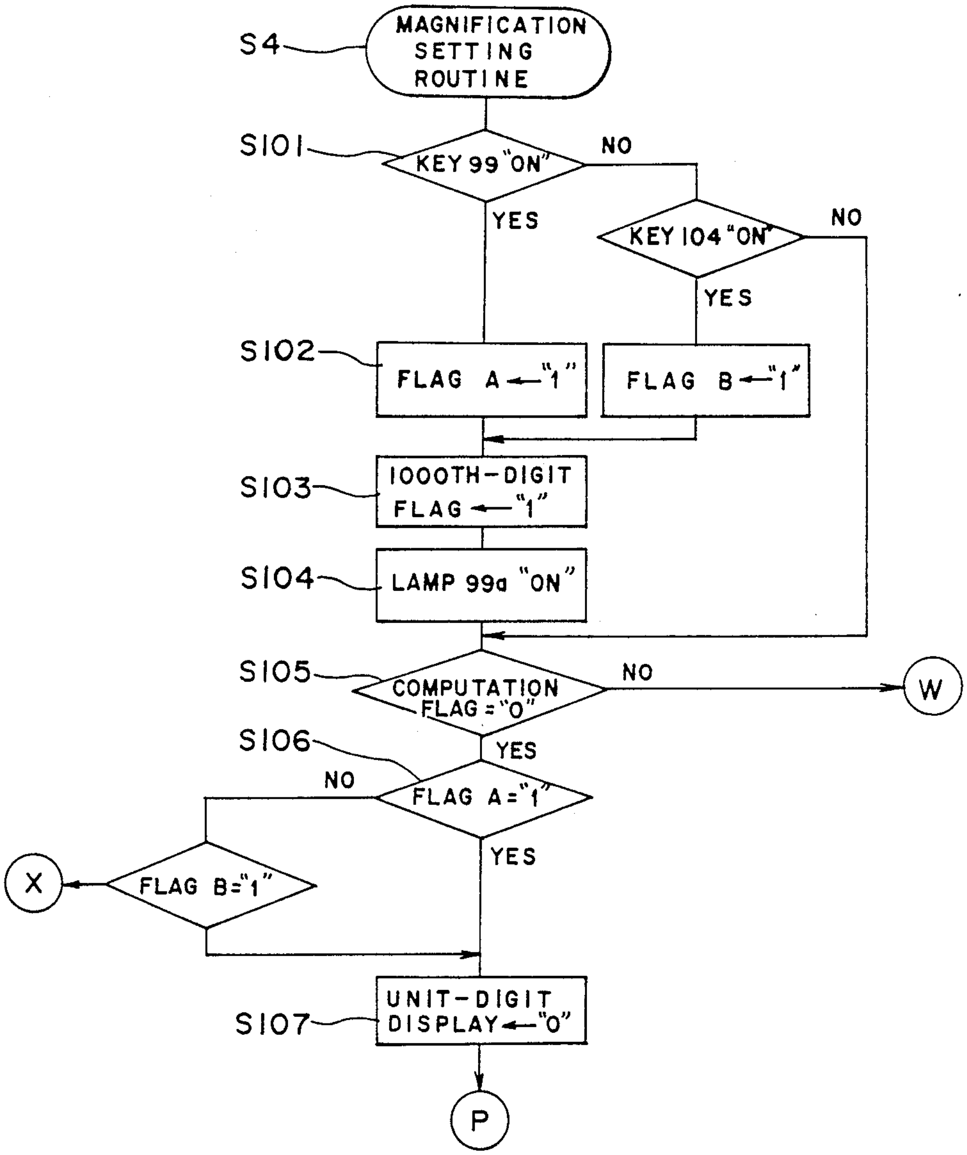
Figure 6B:
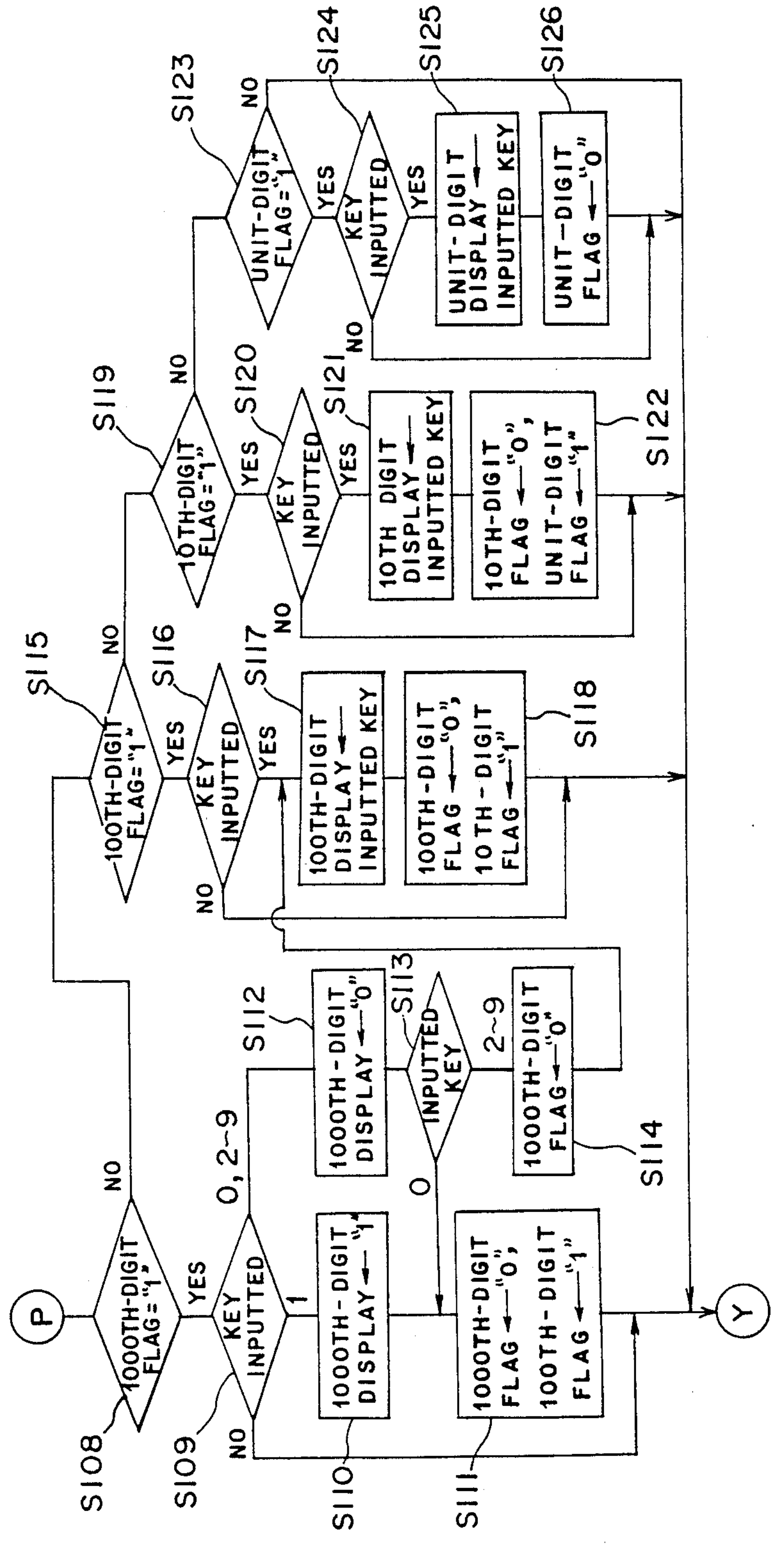

In FIGS. 6*a* and 6*b*, at steps S101 and S102, a decision is made as to which group of the first group of the keys 95 to 98 and the second group of the keys 100 to 103 a request for magnification setting is made to in the case where the control mode of the copying apparatus K has been changed over to one of the first and second magnification setting modes through actuation of a corresponding one of the keys 99 and 104. When the key 99 has been actuated, a flag A for indicating the first magnification setting mode is set at "1". On the other hand, when the key 104 has been actuated, a flag B for indicating the second magnification setting mode is set at "1". Subsequently, the display lamp 99*a* for indicating the first magnification setting mode is turned on at step S104. If it is found at step S105 that a computation flag is "0", step S106 follows. Meanwhile, if it is found at step S105 that the computation flag is "1", step S105 jumps to step S219 (FIG. 7*b*).

When either one of the keys 99 and 104 has been actuated, a 1000th-digit flag is set at "1" at step S103 and a unit-digit display is set at "0" at step S107. Namely,. when the control mode of the copying apparatus K has been changed over to either one of the first and second magnification setting modes, the digital display unit 72 displays a numeral of "bbb0" (b denoting a blank) and is held in a waiting state for receiving an input of the 1000th digit.

When one of the ten keys 80 to 89 has been actuated in this state, a decision is made at step S109 as to which one of the ten keys 80 to 89 has been actuated. Only if it is found at step S109 that the key 80 corresponding to the numeral of "1" has been actuated, a 1000th-digit display is set at "1" at step S110 followed by step S111. It should be noted that, although the inputted numerals are expressed here by a 1000th digit, a 100th digit, a 10th digit and a unit digit for convenience's sake in connection with the digital display unit 72, the numeric value of the magnification represents a decimal digit having four significant figures of the third decimal place. Meanwhile, if it is found at step S109 that one of the keys 81 to 89 corresponding, respectively, to the numerals of 2 to 9 and 0 has been actuated in the state where the 1000th-digit flag is "1", the 1000th-digit display is set at "0" at step S112. Thereafter, if it is found at step S113 that the key 89 corresponding to the numeral of "0" has been actuated, the 1000th-digit flag is set at "0" and a 100th-digit flag is set at "1" so as to receive an input of the 100th digit at step S111. Meanwhile, if it is found at step S113 that one of the keys 81 to 88 corresponding, respectively, to the numerals of 2 to 9 has been actuated, the 1000th-digit flag is set at "0" at step S114 and then, the 100th-digit display is set at one of the numerals of 2 to 9, corresponding to the actuated one of the keys 81 to 88.

The above described processing at the time of the 1000th-digit flag being "1" is based on a presumption that the effective copying magnifications range from 0.647 to 1.414. Consequently, only the numeral of "1" or "0" can be displayed at the 1000th digit. Thus, a key operation for inputting the numeral of "0" to the 1000th digit can be omitted. However, in this case, such a phenomenon may take place that the inputted numeric value is brought out of the range of the effective copying magnifications by the inputted numeric values of the 100th digit or less. A processing therefor will be described in a subroutine in FIGS. 7 and 8.

When a numeral is inputted to the 100th digit, the 100th-digit flag is set at "1". When one of the ten keys 80 to 89 is actuated in this state, one of the numerals of 0 to 9, corresponding to the actuated one of the ten keys 80 to 89, is inputted to the 100th digit at step S117. Then, at step S118, the 100th-digit flag is set at "0" and a 10th-digit flag is set at "1". In the same manner as the 100th digit, numerals are, respectively, inputted to the 10th digit and the unit digit by actuating the ten keys 80 to 89.

Flow charts of FIGS. 7*a* and 7*b* show a processing in which the numerals inputted and displayed in the processing of FIGS. 6*a* and 6*b* are stored in the memories Q1 to Q8 corresponding, respectively, to the keys 100 to 103 and 95 to 98 to be actuated subsequently. Initially at step S201, a decision is made as to whether the copying apparatus K is in the first magnification setting mode or the second magnification setting mode. Since step S201 is executed only when either one of the flags A and B is "1", only a decision as to whether or not the flag A is "1" is made at step S201. If it is found at step S201 that the flag A is "1", the copying apparatus K is in the first magnification setting mode, so that steps 219 and so on follow in which decisions are made as to whether or not the first group of the keys 95 to 98 have been actuated. Meanwhile, if it is found at step S201 that the flag A is not "1", namely the flag B is "1", the copying apparatus K is in the second magnification setting mode, so that steps S202 and so on follow in which decisions are made as to whether or not the second group of the keys 100 to 103 have been actuated.

In the processing of FIGS. *7a* and *7b*, the displayed numeric values are fundamentally stored in the memories Q1 to Q8 corresponding, respectively, to the actuated keys 100 to 103 and 95 to 98 regardless of whether the copying apparatus K is in the first magnification setting mode or the second magnification setting mode. However, as described above, there is a possibility that a numeric value falling out of the permissible range of the copying magnifications is displayed at this stage. Accordingly, in the processing of FIGS. *7a* and *7b*, after a decision is made as to whether or not each of the keys 95 to 98 and 100 to 103 has been actuated, the subroutine of step S203 is executed such that the numeric value falling out of the permissible range of the copying magnifications is not stored in each of the memories Q1 to Q8. The processing of step S203 is shown in FIG. 8.

In FIG. 8, if it is found that the displayed numeric value is not "0", a decision is made at step S240 whether or not the displayed numeric value is less than 0.647 In the case of "YES" at step S240, the displayed numeric value is set at 0.647 at step S241. Then, at step S242, a decision is made as to whether or not the displayed numeric value is greater than 1.414. In the case of "YES" at step S242, the displayed numeric value is set at 1.414 at step S243.

Hereinbelow, the processing of FIGS. *7a* and *7b* will be described in connection with the processing of step S203. When the first group of the keys 95 to 98 or the second group of the keys 100 to 103 are actuated in the case where the copying apparatus K is in the first magnification setting mode or the second magnification setting mode, the displayed numeric values falling out of the permissible range of the copying magnifications are set at the permissible limit values and then, the displayed numeric values are stored in the memories Q1 to Q8 corresponding, respectively, to the keys 100 to 103 and 95 to 98. Subsequently, in the case where the copying apparatus K is in the first magnification setting mode, the flag A is set at "0" and then, step S222 follows. Meanwhile, in the case where the copying apparatus K is in the second magnification setting mode, the flag B is set at "0" and then, step S206 follows.

When each of the second group of the keys 100 to 103 has been turned on in the case of the second magnification setting mode, the display lamp 99*a* for indicating the first magnification setting mode is turned off at step S206 and then, step S207 follows. Meanwhile, when each of the first group of the keys 95 to 98 has been turned on in the case of the first magnification setting mode, the computation flag is set at "0" at step S222 and then, the display lamp 99*a* is turned off at step S223. Thereafter, at step S224, the display lamp 110*a* for indicating the compute mode is turned off and then, step S207 follows. Namely since the display lamp 99*a* indicates that the copying apparatus K is in the first magnification setting mode, the display lamp 99*a* is turned off after the displayed numeric values have been stored in the memories Q1 to Q8 corresponding, respectively, to the actuated keys 100 to 103 and 95 to 98. Meanwhile, since the display lamp 110*a* indicates that the copying apparatus K is in the compute mode, the display lamp 110*a* is turned off after the computed results have been stored in the memories Q5 to Q8 corresponding, respectively, to the keys 95 to 98.

If it is found at step S207 that the clear/stop key 91 (FIG. 2) has been actuated, the digital display unit 72 displays a numeral of "bbb1" (b denoting a blank) at step S208 and then, the flags A and B are set at "1" at step S209. Namely, when the clear/stop key 91 has been actuated, the displayed numeric value is cleared and the first and second magnification setting modes are cancelled. Consequently, the displayed numeric value of "1" means a standard setting number of copies to be made.

Figure 9:
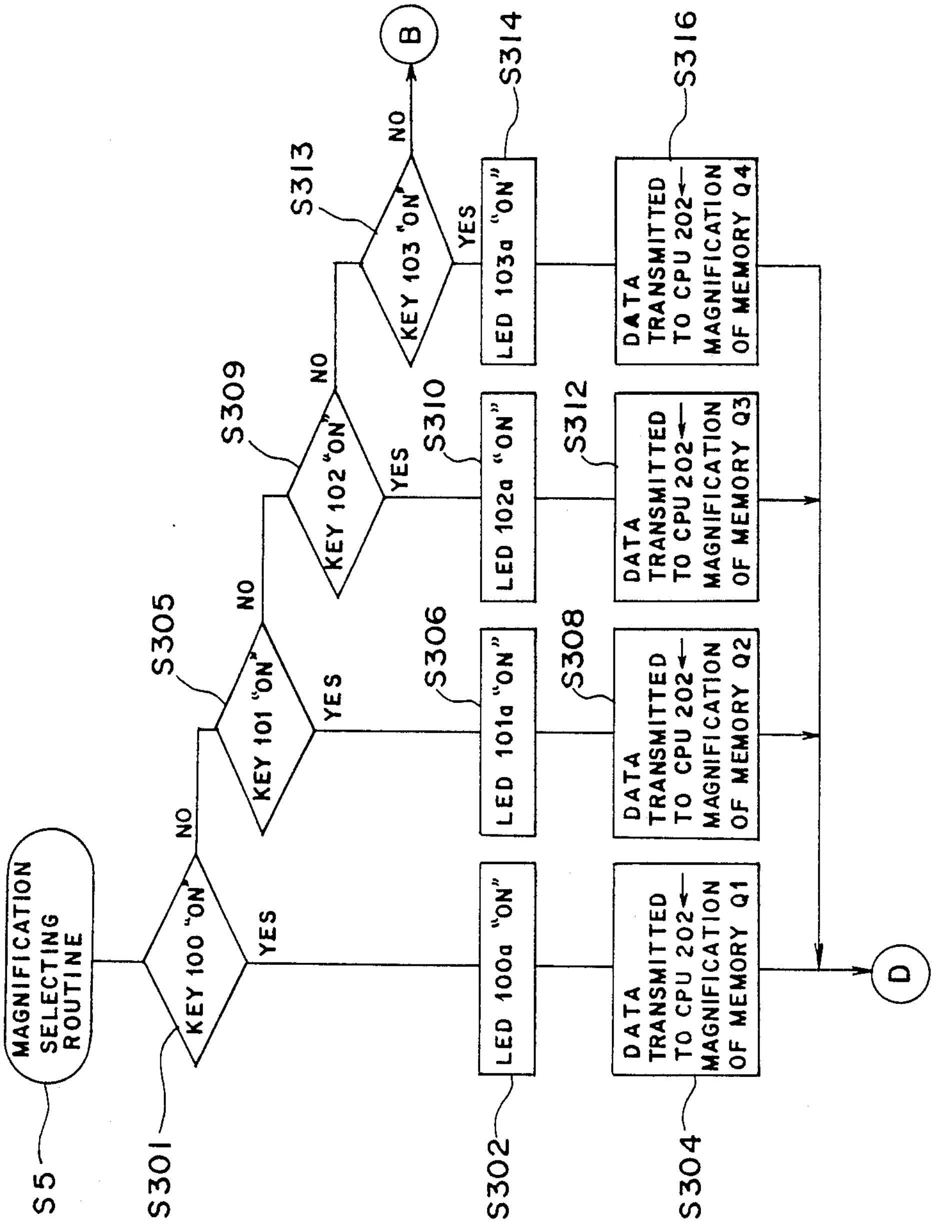
Figure 10:
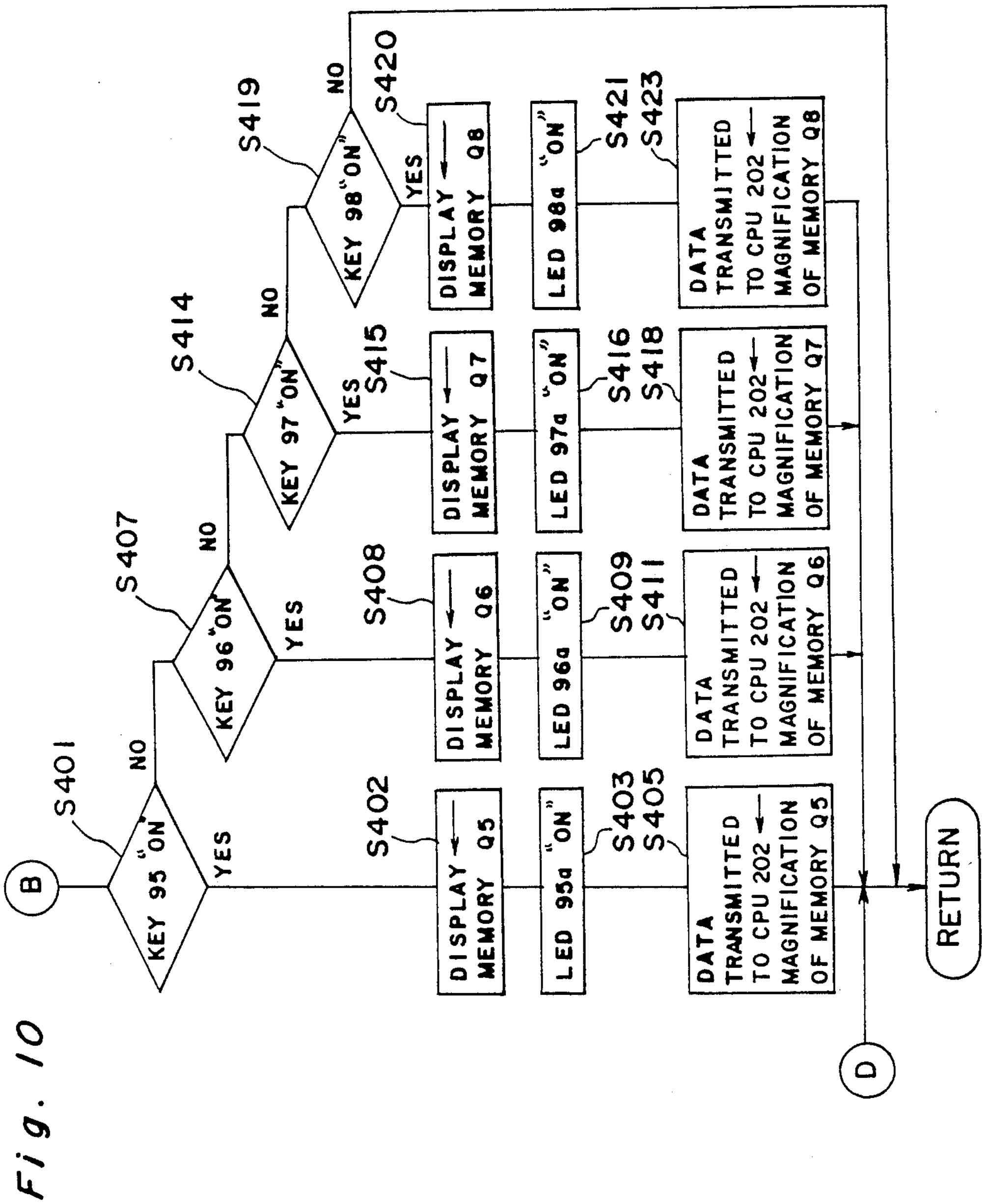

FIGS. 9 and 10 show the processing of step S5 (FIG. 4) executed after actuation of the second group of the keys 100 to 103 and the first group of the keys 95 to 98.

In FIG. 9, when any one of the keys 100, 101, 102 and 103 corresponding, respectively, to light emitting diodes 100*a*, 101*a*, 102*a* and 103*a* (FIG. 2), has been actuated, one of the light emitting diodes 100*a* to 103*a* corresponding to the actuated one of the keys 100 to 103 is turned on. Subsequently, each of the numeric values stored in the memories Q1 to Q4, respectively is transmitted, as magnification data, to the second CPU 202.

In FIG. 10, when any one of the keys 95, 96, 97 and 98 corresponding, respectively, to light emitting diodes 95*a*, 96*a*, 97*a* and 98*a* (FIG. 2) has been actuated, one of the light emitting diodes 95*a* to 98*a* corresponding to the actuated one of the keys 95 to 98 is turned on in the same manner as FIG. 9. Furthermore, since the copying apparatus K is in the first magnification setting mode for setting the copying magnifications arbitrarily, the numeric values stored in the memories Q5 to Q8 are displayed by the digital display unit 72 at steps S402, S408, S415 and S420, respectively. It is so arranged that the digital display unit 72 displays each of the numeric values only when each of the keys 95 to 98 is being depressed and that the number of copies, stored in another storage device is called so as to be displayed by the digital display unit 72 when each of the keys 95 to 98 has been released. Then, each of the numeric values stored in the memories Q5 to Q8 is transmitted, as magnification data, to the second CPU 202.

FIGS. 11*a*(1) and 11*b*(1), FIGS. 11*a*(2) and 11*b*(2), FIGS. 11*a*(3) and 11*b*(3), FIGS. 11*a*(4) and 11*b*(4) and FIGS. 11*a*(5) and 11*b*(5) show processings for computing the copying magnifications in the compute mode, respectively and are, respectively, directed to processings of computation of division, addition, subtraction, multiplication and square In FIGS. 11*a*(1) and 11*b*(1) for the root evolution. The FIGS. 11*a*(1) and 11*b*(1) for the processing of computation of division, if it is found at step S501 that the compute mode key 110 has been depressed, a decision is made at step S502 as to whether or not the computation flag is "0". In the case of "YES" at step S502, the display lamp 110*a* for indicating the compute mode is turned on by the positive edge of the signal of the compute mode key 110 at step S503. Then, a dividend flag for indicating a state for inputting a dividend, for example, a size of the copy paper by using the ten keys 80 to 89 is set at "1" at step S504. Thereafter if it is found at step S517 that the dividend, e.g. the size of the copy paper, has been keyed in by using the ten keys 80 to 89, this datum is displayed by the digital display unit 72. Meanwhile, if it is found at step S502 that the computation flag is "1", the display lamp 110a and the display lamp 99a for indicating the first magnification setting mode are turned off by the positive edge of the signal of the compute mode key 110 at steps S505 and S506, respectively and then, the computation flag is set at "0" at step S507. Steps S505 to S507 are provided for cancelling the compute mode in the case where the computation is performed without storing the computed result in each of the memories Q1 to Q8 corresponding, respectively, to the keys 100 to 103 and 95 to 98.

Subsequently, if it is found at step S508 that the division key 111 has been depressed, setting of the dividend is finished by the positive edge of the signal of the division key 111, so that the dividend flag is set at "0" at step S509. Then, a divisor flag for indicating a state for inputting a divisor, for example, a size of the original sheet to be copied is set at "1" at step S510. Thereafter, if it is found at step S520 that the divisor, e.g. the size of the original sheet has been keyed in by using the ten keys 80 to 89, this datum is displayed by the digital display unit 72.

Furthermore, if it is found at step S511 that the "equal" key 112 has been depressed, the divisor flag is set at "0" by the positive edge of the signal of the "equal" key 112 at step S512 and then, the display lamp 99a is turned on at step S513 in the same manner as the first magnification setting mode. Subsequently, division for dividing the dividend, e.g. the size of the copy paper, by the divisor, e.g. the size of the original sheet, is performed at step S514 and then, the computation flag is set at "1" at step S515. When the computation flag becomes equal to "1", step S105 of FIG. 6a proceeds to step S219 of FIG. 7b, so that it becomes possible to set the copying magnifications in the same manner as the first magnification setting mode.

Then, at steps S516 to S518, if the dividend flag is "1", the input data of the ten keys 80 to 89 are stored in a dividend area. Further, at steps S519 to S521, if the divisor flag is "1", the input data of the ten keys 80 to 89 are stored in a divisor area.

Moreover, if it is found at step S522 that the . clear/-stop key 91 has been depressed, a decision is made at step S523 whether or not the dividend flag is "1" by the positive edge of the signal of the clear/stop key 91. In the case of "YES" at step S523, the data stored in the dividend area are set at "0" at step S524. Meanwhile, in the case of "NO" at step S523, a decision is made at step S525 as to whether or not the divisor flag is "1". In the case of "YES" at step S525, the data stored in the divisor area are set at "0" at step S526.

Since the quotient of the division, in which the size of the copy paper (the length of one side thereof) and the size of the original sheet (the length of the corresponding side thereof) are, respectively, inputted as the dividend and the divisor, can be directly used as the copying magnification as described above, the processing of computation of the division can be utilized conveniently. Furthermore, when a request for reducing or enlarging a specific figure of, for example, 15 cm in length or diameter to that of 13 cm in length or diameter is made, the arithmetic operation of division can be performed by inputting the numeric values in the same manner as described above, whereby the quotient obtained by the division can be directly used as the copying magnification.

Moreover, the copying apparatus K of the present invention is capable of performing computation of addition, subtraction, multiplication and square root evolution as shown in FIGS. 11a(2) and 11b(2), FIGS. 11a(3) and 11b(3), FIGS. 11a(4) and 11b(4) and FIGS. 11a(5) and 11b(5), respectively. These functions of the arithmetic operations of the copying apparatus K can also be effectively used for setting the copying magnifications. Namely, the processing of addition or subtraction can be used for copying at a numeric value slightly greater than or less than a preset magnification. Meanwhile, the processing of multiplication can be used for obtaining numeric data of a certain percent greater than or less than previously stored numeric data. When a request for copying at a reduced size magnification of 70% by area or 80% by area is made, the processing of square root evolution can be used for obtaining the copying magnification by extracting a square root of 0.7 or 0.8.

The processings of FIGS. 11a(2) and 11b(2) for addition, FIGS. 11a(3) and 11b(3) for subtraction and FIGS. 11a(4) and 11b(4) for multiplication are substantially identical with the processing of FIGS. 11a(1) and 11b(1) for division. Furthermore, the processing of FIGS. 11a(5) and 11b(5) for square root evolution is also substantially identical with the processing of FIGS. 11a(1) and 11b(1) for division, except that the number of numeric values inputted in computation of square root evolution is only one with the result that the processing of flags for indicating kinds of the inputted numeric values is executed only once. Since concrete techniques for computation of division (FIGS. 11a(1) and 11b(1)), addition (FIGS. 11a(2) and 11b(2)), subtraction (FIGS. 11a(3) and 11b(3)), multiplication (FIGS. 11a(4) and 11b(4)) and square root evolution (FIGS. 11a(5) and 11b(5)) are well known, detailed description thereof is abbreviated for the sake of brevity. In addition, it is to be noted here that the result of the arithmetic operation is stored in the memory corresponding to the actuated key by the processing flowing from step S105 of FIG. 6a to step S219 of FIG. 7b through the connectors W and Q so as to be directly used as the copying magnification and therefore, is not required to be inputted again.

As is clear from the foregoing description of setting of the copying magnifications performed by the copying magnification setting device of the copying apparatus of the present invention, arbitrary copying magnifications requested by the respective operators can be set easily by employing the first magnification setting mode and the set magnifications can be used as the control data of the copying apparatus while being displayed for confirmation by calling them at any time as required. Meanwhile, in the second magnification setting mode, such an effect is achieved that the copying magnification can be corrected remarkably easily by observing the error between the predetermined nominal copying magnification previously set and the actual copying magnification from the duplicate produced actually at the predetermined nominal copying magnification.

In response to setting of the copying magnifications, movement of the lens 14 is controlled by the drive circuit 206 for the stepping motor M4 on the basis of outputs of the second CPU 202 in accordance with the set copying magnifications. At this time, the stepping motor M4 is drivingly so controlled as to rotate forwardly or reversely by one pitch per a numeric value of 0.001 or 0.002. Accordingly, it becomes possible to perform copying at varied magnifications in a practically substantially stepless manner. Meanwhile, the optical system 10 is controlled by the drive circuit 205 on the basis of outputs of the second CPU 202 such that drive speed of the optical system 10 is variable in accordance with the set copying magnifications. However, since a number of methods of controlling drive speed of the DC motor M3 acting as its drive source have been conventionally proposed or provided, detailed description thereof is abbreviated here.

Meanwhile, referring back to FIG. 2, when a white board writable and erasable with specific writing utensils, or a detachable adhesive sticker, or a magnetically detachable panel or the like is employed as a panel portion 70*a* adjacent to the first group of the keys 95 to 98, the panel portion 70*a* can be conveniently used by writing thereon characters indicative of a usage purpose of the arbitrarily set magnification, for example, "magazine→A4". It can be also so arranged that the panel portion 70*a* projects out of or is recessed into the front face of the operating panel 70 as required.

Figure 12A:
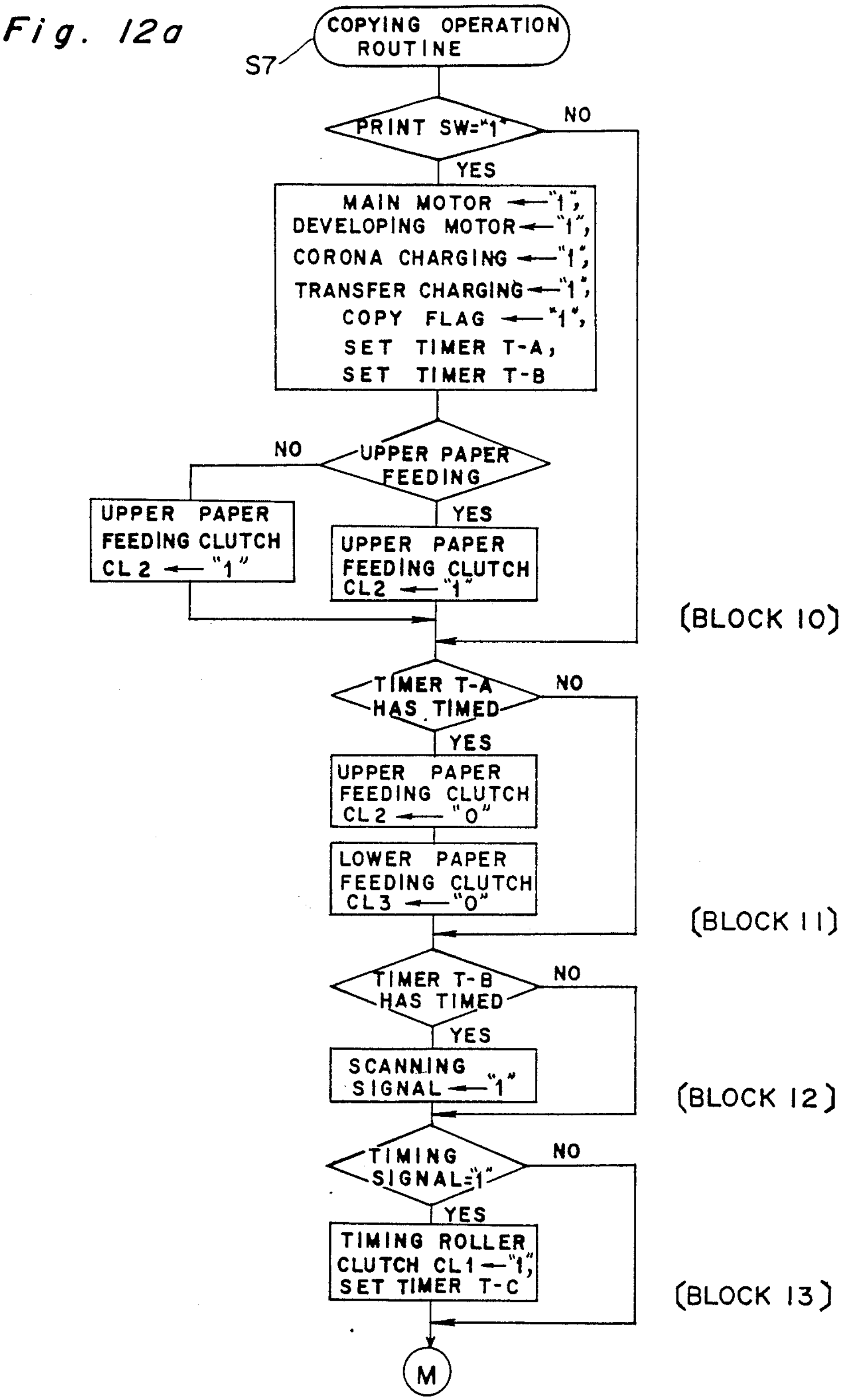
Figure 12B:
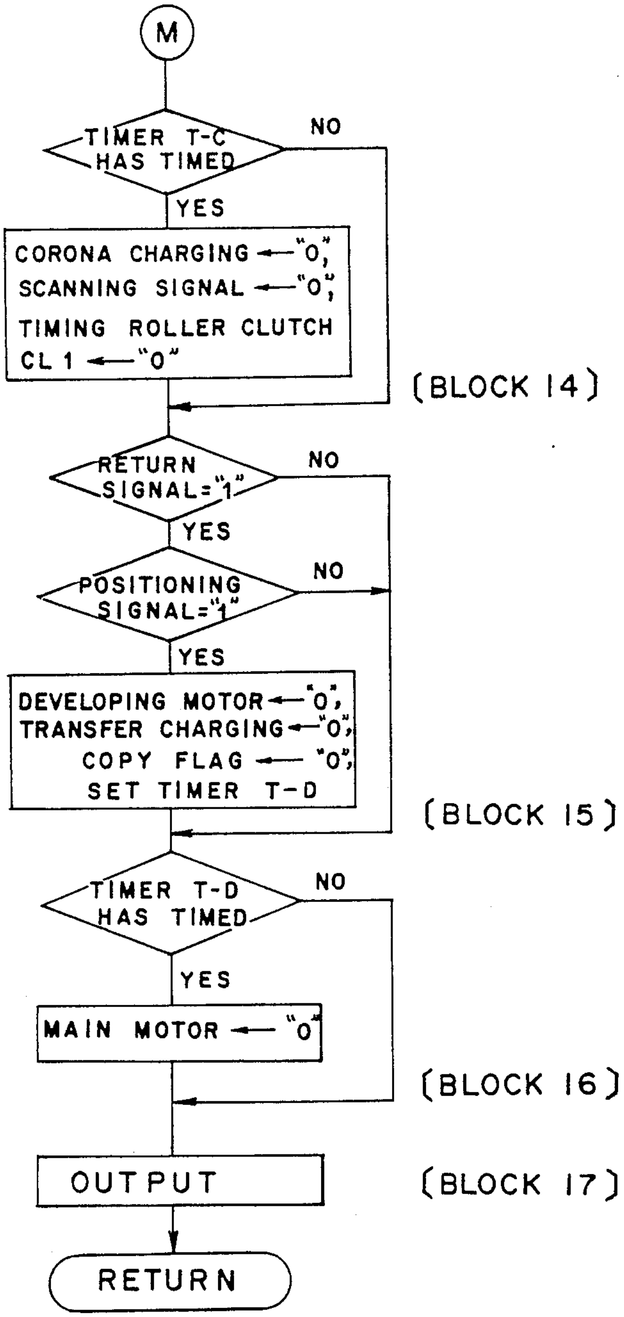
Figure 13:
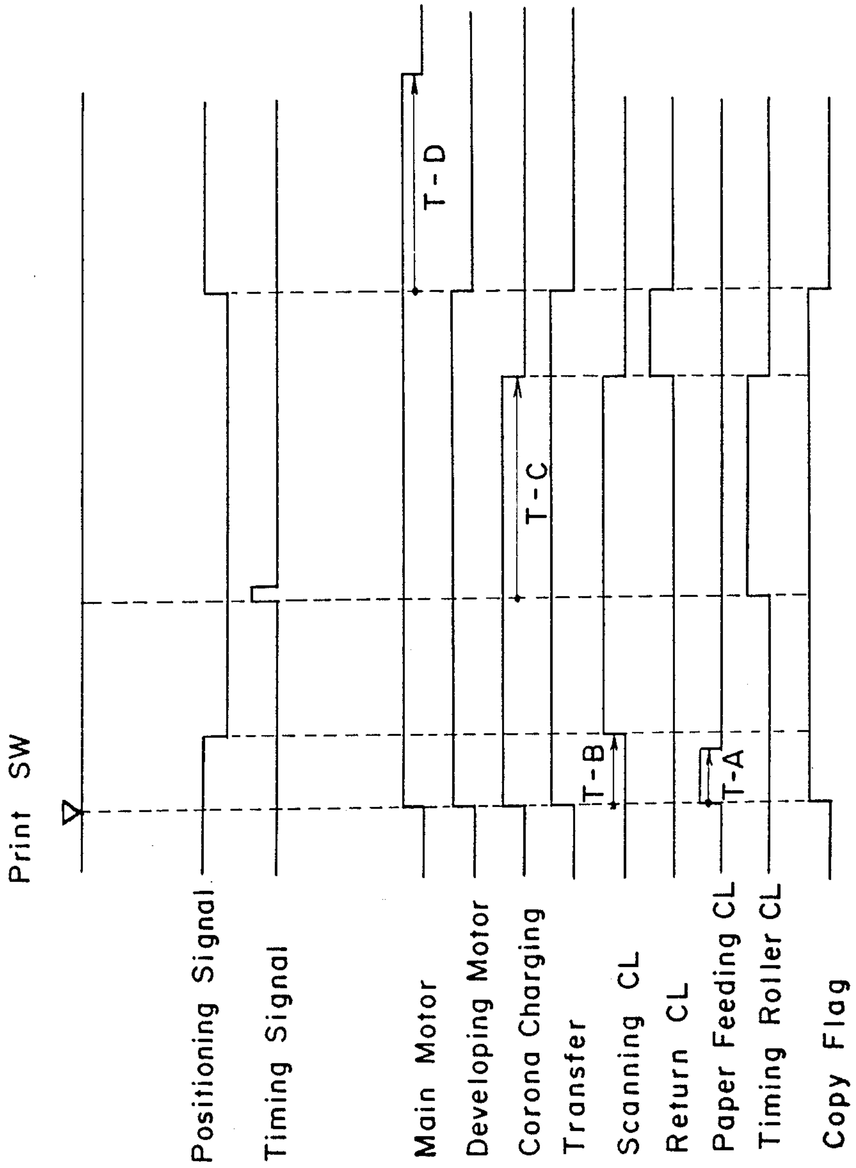
FIG. 13 is a time chart explanatory of the copying operations shown in FIG. 12**.

FIGS. 12*a* and 12*b* are flow charts showing one example of the processing for controlling the copying operation of the copying apparatus K. The processing of FIGS. 12*a* and 12*b* will be briefly described with reference to the time chart of FIG. 13, hereinbelow. At block 10, the main motor M1, developing motor M2, main corona charger 5 and transfer charger 7 are actuated by turning on the print key 71, a copy flag for indicting that the copying apparatus K is performing the copying operation is set at "1", timers T-A and T-B for controlling the copying operation start timing operation, and a selected one of the upper and lower paper feeding clutches CL2 and CL3, i.e., the upper paper feeding clutch CL2 is turned on in this example. Then, at block 11, the selected upper paper feeding clutch CL2 is turned off upon lapse of the preset time of the time T-A. Subsequently, at block 12, upon lapse of the preset time of the timer T-B, the DC motor M3 for scanning is turned on so as to start the scanning operation.

At block 13, when a timing signal is outputted during the scanning operation, the timing roller clutch CL1 is turned on and a timer T-C starts the timing operation. The copy paper is transported synchronously with the image on the photosensitive drum 1 by the timing rollers 26. At block 14, upon lapse of the preset time of the time T-C, the main corona charger 5, DC motor M3 and timing roller clutch CL1 are turned off. Meanwhile, it can be also so arranged that the preset time of the timer T-C is variable in accordance with sizes of the selected copy papers. At block 15, when a positioning switch has been turned on upon return of the optical system 10 to its predetermined position in response to a return signal, the developing motor M2 and the transfer charger 7 are turned off, the copy flag is set at "0", and a timer T-D starts the timing operation. At block 16, upon lapse of the preset time of the timer T-D, the main motor M1 is turned off. Meanwhile, it is to be noted that the timers T-A, T-B, T-C and T-D referred to above are digital timers which are so programmed as to count one routine of the processing executed by the first CPU 201 within a time period regulated by an internal timer as "one" and which store the predetermined time periods as the numeric data, respectively.

Meanwhile, although the compute mode key 110, division key 111, "equal" key 112, addition key 901, subtraction key 902, multiplication key 903, square root key 904 and key 905 are additionally provided on the operating panel 70 in this embodiment so as to be exclusively used for computing the copying magnifications, it can be also so arranged that other keys act, through necessary signal processings, also as these keys for computing the copying magnifications.

As is clear from the foregoing description, in accordance with the present invention, since the copying magnifications can be set in a stepless manner through simple operations, it becomes possible to perform copying at arbitrary magnifications at any time.

Furthermore, in accordance with the present invention, since the copying magnifications can be calculated by the copying apparatus and the calculated magnifications can be directly used as the copying magnifications, it becomes possible to perform copying at arbitrary varied magnifications easily.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A copying apparatus for reproducing copies from an original document comprising:

- a housing member;
- means for supporting an original document on the housing member;
- means for providing copy paper;
- means for reproducing any indicia on the original document on the copy paper;
- an operator panel attached to the housing member including a numeric value input means which is manually operable by an operator to input arbitrary values relevant to the size of indicia on the original document and to a desired size of copied indicia, and a display means for electro-optically displaying a numeric value which has been input by said numeric value input means on the operator panel;
- first memory means for storing any numeric data, relevant to the size of indicia on the original document, input by the input means;
- second memory means for storing any numeric data, relevant to desired size of copied indicia, input by the input means;
- an arithmetic means for executing a predetermined arithmetic operation based on the numeric data stored in said first memory means and said second memory means;
- third memory means for storing an arithmetic result obtained by the arithmetic operation which has been executed by said arithmetic means; and
- a magnification control means which reads the arithmetic result, stored in said third memory means, as copying magnification data so as to control operations of said copying apparatus on the basis of the copying magnification data.

2. A copying apparatus as claimed in claim 1, wherein said magnification control means controls at least positions of a projection lens of said copying apparatus on the basis of the arithmetic result stored in said memory means.

3. A copying apparatus as claimed in claim 1, wherein said arithmetic means is operatively associated with said display means such that the arithmetic result is displayed by said display means when the arithmetic operation has been executed by said arithmetic means.

4. A copying apparatus as claimed in claim 3, wherein said numeric value input means is used, in an ordinary mode of said copying apparatus, for inputting the number of copies to be made such that said display means displays the number of copies, which has been inputted by said numeric value input means, said copying apparatus performing copying operations continuously a plurality of times equal to the number of copies, which is displayed by said display means.

5. A copying apparatus as claimed in claim 4, wherein said numeric value input means is used, in a magnification data setting mode of said copying apparatus, for inputting the copying magnification data, the numeric data displayed by said display means being capable of being stored in said third memory means upon said predetermined operation in the magnification data setting mode of said copying apparatus.

6. A copying apparatus as claimed in claim 1, further including a range memory means for storing a permissible range of copying magnifications of said copying apparatus, said copying apparatus being so controlled as to prevent the arithmetic result from being stored in said third memory means even upon said predetermined operation in the case where the arithmetic result falls out of the permissible range of the copying magnifications of said copying apparatus.

7. A copying apparatus as claimed in claim 6, which, when the arithmetic result falls out of the permissible range of the copying magnifications of said copying apparatus, is so controlled as to forcibly correct, upon said predetermined operation, the arithmetic result to one of upper and lower limits of the permissible range more approximate to the arithmetic result than the other one thereof such that the one of the upper and lower limits of the permissible range is stored in said third memory means.

8. A copying apparatus for reproducing copies from an original document comprising:

means for reproducing image of an original document on a copy paper;

numeric value input means which is manually operable by an operator to input arbitrary numeric values;

an arithmetic means for extracting a square root of the input data;

memory means for storing an arithmetic result obtained by the arithmetic operation; and a magnification control means which reads the arithmetic result, stored in said memory means, as copying magnification data so as to control operations of the copying apparatus on the basis of the copying magnification data.

9. A copying apparatus as claimed in claim 8, further comprising:

means for displaying numeric values input by said numeric input means.

10. A copying apparatus as claimed in claim 9, wherein said arithmetic means is operatively associated with said display means such that the arithmetic result is displayed by said display means when the arithmetic operation has been executed by said arithmetic means.

11. A copying apparatus as claimed in claim 8, wherein said magnification control means controls at least positions of a projection lens of said copying apparatus on the basis of the arithmetic result stored in said memory means.

12. A copying apparatus as claimed in claim 8, further including a range memory means for storing a permissible range of copying magnifications of said copying apparatus, said copying apparatus being so controlled as to prevent the arithmetic result from being stored in said memory means even upon said predetermined operation in the case where the arithmetic result falls out of the permissible range of the copying magnifications of said copying apparatus.

13. A copying apparatus as claimed in claim 12, which, when the arithmetic result falls out of the permissible range of the copying magnifications of said copying apparatus, is so controlled as to forcibly correct, upon said predetermined operation, the arithmetic result to one of upper and lower limits of the permissible range more approximate to the arithmetic result than the other one thereof such that the one of the upper and lower limits of the permissible range is stored in said memory means.

14. A copying apparatus for reproducing copies from an original document comprising:

means for reproducing image of an original document on a copy paper;

numeric value input means which is manually operable by an operator to input arbitrary numeric values;

first memory means for temporarily storing two input values;

an arithmetic means for multiplying said two values stored in said first memory means;

second memory means for storing an arithmetic result obtained by the arithmetic operation; and a magnification control means which reads the arithmetic result, stored in said second memory means, as copying magnification data so as to control operations of the copying apparatus on the basis of the copying magnification data.

15. A copying apparatus as claimed in claim 14, further comprising:

means for displaying numeric values input by said numeric input means.

16. A copying apparatus as claimed in claim 15, wherein said arithmetic means is operatively associated with said display means such that the arithmetic result is displayed by said display means when the arithmetic operation has been executed by said arithmetic means.

17. A copying apparatus as claimed in claim 14, wherein said magnification control means controls at least positions of a projection lens of said copying apparatus on the basis of the arithmetic result stored in said memory means.

18. A copying apparatus as claimed in claim 14, further including a range memory means for storing a permissible range of copying magnifications of said copying apparatus, said copying apparatus being so controlled as to prevent the arithmetic result from being stored in said second memory means even upon said predetermined operation in the case where the arithmetic result falls out of the permissible range of the copying magnifications of said copying apparatus.

19. A copying apparatus as claimed in claim 18, which, when the arithmetic result falls out of the permissible range of the copying magnifications of said copying apparatus, is so controlled as to forcibly correct, upon said predetermined operation, the arithmetic result to one of upper and lower limits of the permissible range more approximate to the arithmetic result than the other one thereof such that the one of the upper and lower limits of the permissible range is stored in said second memory means.

20. A copying apparatus for reproducing copies from an original document comprising:

means for reproducing image of an original document on a copy paper;

numeric value input means which is manually operable by an operator to input arbitrary numeric values;

first memory means for temporarily storing two input values;

an arithmetic means for adding up said two values stored in said first memory means;

second memory means for storing an arithmetic result obtained by the arithmetic operation; and a magnification control means which reads the arithmetic result, stored in said second memory means, as copying magnification data so as to control operations of the copying apparatus on the basis of the copying magnification data.

21. A copying apparatus as claimed in claim 20, further comprising:

means for displaying numeric values input by said numeric input means.

22. A copying apparatus as claimed in claim 21, wherein said arithmetic means is operatively associated with said display means such that the arithmetic result is displayed by said display means when the arithmetic operation has been executed by said arithmetic means.

23. A copying apparatus as claimed in claim 20, wherein said magnification control means controls at least positions of a projection lens of said copying apparatus on the basis of the arithmetic result stored in said memory means.

24. A copying apparatus as claimed in claim 20, further including a range memory means for storing a permissible range o copying magnifications of said copying apparatus, said copying apparatus being so controlled as to prevent the arithmetic result from being stored in said second memory means even upon said predetermined operation in the case where the arithmetic result falls out of the permissible range of the copying magnifications of said copying apparatus.

25. A copying apparatus as claimed in claim 24, which, when the arithmetic result falls out of the permissible range of the copying magnifications of said copying apparatus, is so controlled as to forcibly correct, upon said predetermined operation, the arithmetic result to one of upper and lower limits of the permissible range more approximate to the arithmetic result than the other one thereof such that the one of the upper and lower limits of the permissible range is stored in said second memory means.

26. A copying apparatus for reproducing copies from an original document comprising:

means for reproducing image of an original document on a copy paper;

numeric value input means which is manually operable by an operator to input arbitrary numeric values;

first memory means for temporarily storing two input values;

an arithmetic means for subtracting one of said two input values stored in said first memory means from another one;

second memory means for storing a arithmetic result obtained by the arithmetic operation; and a magnification control means which reads the arithmetic result, stored in said second memory means, as copying magnification data so as to control operations of the copying apparatus on the basis of the copying magnification data.

27. A copying apparatus as claimed in claim 26, further comprising:

means for displaying numeric values input by said numeric input means.

28. A copying apparatus as claimed in claim 27, wherein said arithmetic means is operatively associated with said display means such that the arithmetic result is displayed by said display means when the arithmetic operation has been executed by said arithmetic means.

29. A copying apparatus as claimed in claim 26, wherein said magnification control means controls at least positions of a projection lens of said copying apparatus on the basis of the arithmetic result stored in said memory means.

30. A copying apparatus as claimed in claim 26, further including a range memory means for storing a permissible range of copying magnifications of said copying apparatus, said copying apparatus being so controlled as to prevent the arithmetic result from being stored in said second memory means even upon said predetermined operation in the case where the arithmetic result falls out of the permissible range of the copying magnifications of said copying apparatus.

31. A copying apparatus as claimed in claim 30, which, when the arithmetic result falls out of the permissible range of the copying magnifications of said copying apparatus, is so controlled as to forcibly correct, upon said predetermined operation, the arithmetic result to one of upper and lower limits of the permissible range more approximate to the arithmetic result than the other one thereof such that the one of the upper and lower limits of the permissible range is stored in said second memory means.

32. An image processing apparatus comprising:

output means for outputting data corresponding to an original image length;

key input means for manually setting data corresponding to desired reproducing image length;

arithmetic means for calculating a magnification based on data output by said output means and the data set by said key input means; and display means for displaying the magnification calculated by said arithmetic means.

33. An apparatus according to claim 32, wherein said output means has a key input means for setting data corresponding to the original image length.

34. An apparatus according to claim 33, wherein said key input means for setting the data corresponding to the original image length and said key input means for setting the data corresponding to the desired reproducing image length are common.

35. An apparatus according to claim 34, wherein said key input means are capable of inputting the data and the number of images to be formed.

36. An apparatus according to claim 32, wherein said key input means is adapted to enter said input data as numerical data.

37. An image processing apparatus comprising;

output means for outputting data corresponding to an original image length;

key input means for manually setting data corresponding to a desired reproducing image length;

arithmetic means for calculating a magnification based on the data output from said output means and the data set by said key input means; and memory means for storing the magnification calculated by said arithmetic means.

38. An apparatus according to claim 37, wherein said output means has key input means for setting data corresponding to the original image length.

39. An apparatus according to claim 38, wherein said key input means for setting data corresponding to the original image length and said key input means for setting the data corresponding to the desired reproducing image length are common.

40. An apparatus according to claim 39, wherein said key input means are capable of inputting the data and the number of images to be formed.

41. An apparatus according to claim 37, wherein said input means is adapted to enter said input data as numerical data.

42. An image processing apparatus comprising:
key input means for setting first data corresponding to an original image length;
output means for outputting second data corresponding to a reproducing image length;
arithmetic means for calculating a magnification in accordance with first and second data; and
registration means for registering the magnification calculated by said arithmetic means such that the magnification is reusable.

43. An apparatus according to claim 42, wherein said output means has key input means for setting the second data corresponding to the reproducing image length.

44. An apparatus according to claim 43, wherein said key input means for setting the first data corresponding to the original image length and said key input means for setting the second data corresponding to the reproducing image length are common.

45. An apparatus according to claim 44, wherein said key input means is capable of inputting the first and second data and the number of images to be formed.

46. An image processing apparatus comprising:
output means for outputting first data corresponding to an original image length;
key input means for setting second data corresponding to a reproducing image length;
arithmetic means for calculating a magnification in accordance with the first and second data; and
registration means for registering the magnification calculated by said arithmetic means such that the magnification is reusable.

47. An apparatus according to claim 46, wherein said output means has key input means for setting the first data corresponding to the original image length.

48. An apparatus according to claim 47, wherein said key input means for setting the first data corresponding to the original image length and said key input means for setting the second data corresponding to the reproducing image length are common.

49. An apparatus according to claim 48, wherein said key input means are capable of inputting the first and second data and the number of images to be formed.

50. An apparatus according to claim 46, wherein said key input means is adapted to enter said input data as numerical data.

* * * * *